US009697583B2

(12) United States Patent
Motohashi et al.

(10) Patent No.: US 9,697,583 B2
(45) Date of Patent: Jul. 4, 2017

(54) IMAGE PROCESSING APPARATUS, IMAGE PROCESSING METHOD, AND COMPUTER-READABLE RECORDING MEDIUM

(71) Applicants: Naoki Motohashi, Kanagawa (JP); Satoshi Nakamura, Kanagawa (JP)

(72) Inventors: Naoki Motohashi, Kanagawa (JP); Satoshi Nakamura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 113 days.

(21) Appl. No.: 14/711,108

(22) Filed: May 13, 2015

(65) Prior Publication Data
US 2015/0332435 A1 Nov. 19, 2015

(30) Foreign Application Priority Data

May 16, 2014 (JP) .................................. 2014-102443
Feb. 17, 2015 (JP) .................................. 2015-028782

(51) Int. Cl.
*G06T 3/40* (2006.01)
*G06K 9/46* (2006.01)
*G06K 9/52* (2006.01)
*G06K 9/62* (2006.01)

(52) U.S. Cl.
CPC .......... *G06T 3/4053* (2013.01); *G06K 9/4642* (2013.01); *G06T 3/4076* (2013.01); *G06K 9/522* (2013.01); *G06K 9/6255* (2013.01); *G06T 2207/20021* (2013.01); *G06T 2210/36* (2013.01)

(58) Field of Classification Search
None
See application file for complete search history.

(56) References Cited

U.S. PATENT DOCUMENTS 8,599,209 B2 12/2013 Kameyama
2007/0103595 A1* 5/2007 Gong .................... H04N 5/262
348/620

(Continued)

FOREIGN PATENT DOCUMENTS

CN 104299193 A * 1/2015
JP 2009-506393 2/2009

(Continued)

OTHER PUBLICATIONS

Xu, J.—"Image superresolution by midfrequency sparse representation and total variation regularization"—SPIE: Journal of Electronic Imaging—Feb. 27, 2015—pp. 1-29.*

(Continued)

*Primary Examiner* — Bernard Krasnic
(74) *Attorney, Agent, or Firm* — Oblon, McClelland, Maier & Neustadt, L.L.P.

(57) ABSTRACT

An image processing apparatus includes a pre-processing unit and a coding unit. The pre-processing unit acquires, from an image, a patch obtained by extracting a partial area of the image. The coding unit determines a value of a design parameter relating to processing of the patch according to the amount of information contained in the acquired patch and representing a state of distribution of pixel values and generates a high-frequency patch from the patch by using the determined value of the design parameter.

10 Claims, 19 Drawing Sheets

(56) References Cited

U.S. PATENT DOCUMENTS

| | | | |
|---|---|---|---|
| 2010/0046829 A1* | 2/2010 | Mahajan | G06K 9/40 |
| | | | 382/159 |
| 2013/0170767 A1* | 7/2013 | Choudhury | G06T 3/4053 |
| | | | 382/260 |
| 2016/0027148 A1* | 1/2016 | Choudhury | G06T 3/4076 |
| | | | 382/254 |

FOREIGN PATENT DOCUMENTS

| | | |
|---|---|---|
| JP | 2010-273328 | 12/2010 |
| WO | 2007/023992 A1 | 3/2007 |

OTHER PUBLICATIONS

Yang, J.—"Image Super-Resolution via Sparse Representation"—IEEE 2010, pp. 2861-2873.*
Freeman, W.—"Example-Based Super-Resolution"—IEEE 2002, pp. 56-65.*
Fan, W.—"Image Hallucination Using Neighbor Embedding over Visual Primitive Manifolds"—IEEE 2007, pp. 1-7.*

* cited by examiner

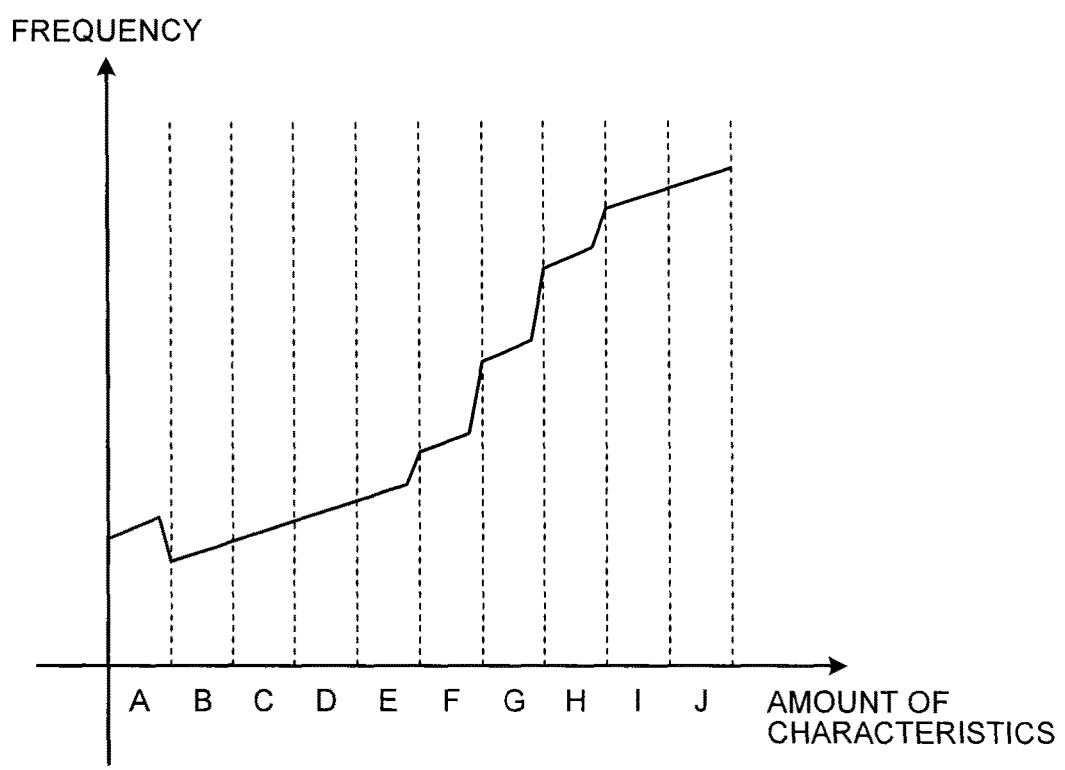

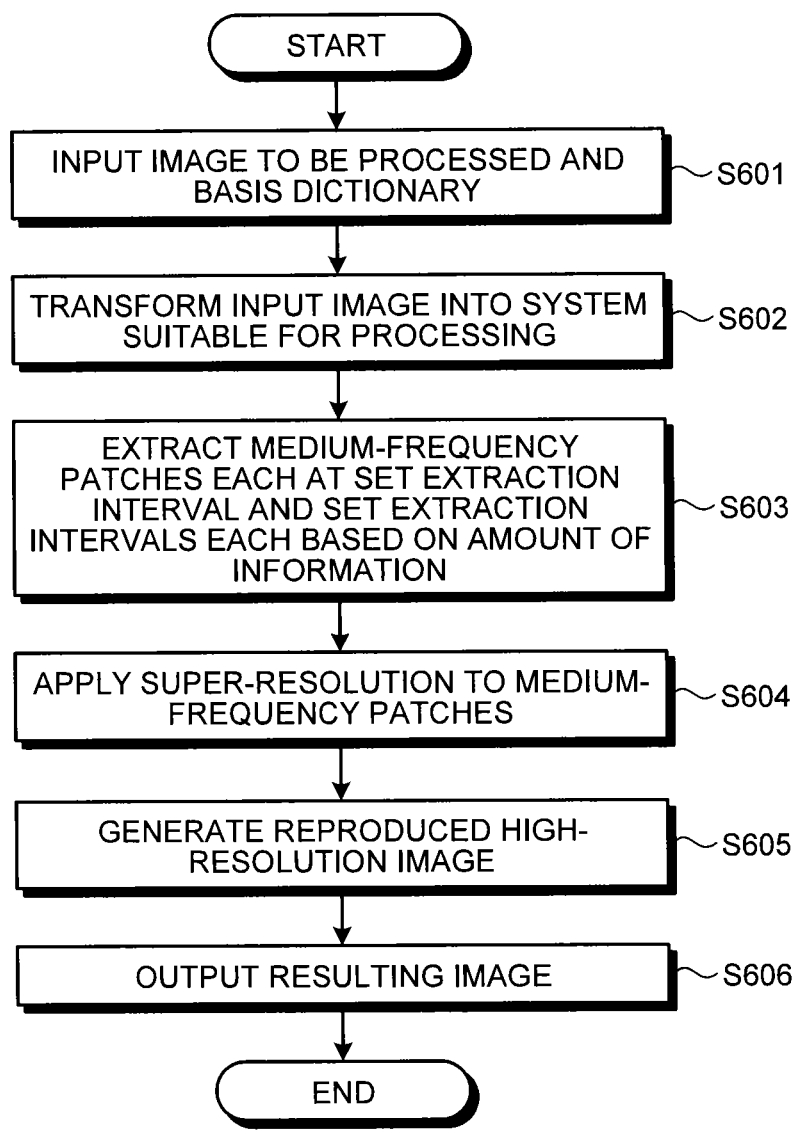

|  | SPARSE LEVEL | EXTRACTION INTERVAL | PATCH SIZE |
|---|---|---|---|
| (1) | 0 | 5 | 13 |
| (2) | ... | ... | ... |
| (3) | ... | ... | ... |
| (4) | ... | ... | ... |
| (5) | ... | ... | ... |
| (6) | ... | ... | ... |
| (7) | ... | ... | ... |
| (8) | ... | ... | ... |
| (9) | ... | ... | ... |
| (10) | ... | ... | ... |

IMAGE PROCESSING APPARATUS, IMAGE PROCESSING METHOD, AND COMPUTER-READABLE RECORDING MEDIUM

CROSS-REFERENCE TO RELATED APPLICATIONS

The present application claims priority to and incorporates by reference the entire contents of Japanese Patent Application No. 2014-102443 filed in Japan on May 16, 2014 and Japanese Patent Application No. 2015-028782 filed in Japan on Feb. 17, 2015.

BACKGROUND OF THE INVENTION

1. Field of the Invention

The present invention relates to an image processing apparatus, an image processing method, and a computer-readable recording medium.

2. Description of the Related Art

A conventional interpolation technology of calculating pixels that do not exist by using pixel values of an original image when extending the image is known as a technology for improving the resolution of the image. Because the interpolation technology, however, calculates pixels that do not exist from the average of multiple pixels, etc., there is a possibility that the edge with a greater luminance change is attenuated and this leads to a generally-blurred image. For this reason, recently, there is a technology of, when extending an image, improving the image resolution by extracting high-frequency components to be lost from an image different from the original image and interpolating the high-frequency components extracted from the different image into the original image. This technology is referred to as super-resolution, and example-based super-resolution from among super-resolution technologies is attracting an attention.

For example, in example-based super-resolution, a high-resolution image and a low-resolution image obtained by deteriorating the high-resolution image according to the process in which the high-resolution image is generated are in a pair. Example-based super-resolution constructs a dictionary by extracting partial areas in the same position from the paired two images. In the following descriptions, a partial area is referred to as a "patch". Patches in any shape may be used. The following descriptions take, as an example, a case where the patch shape corresponds to rectangular areas. To construct the dictionary, the frequencies of the extracted patches are analyzed and converted into high-frequency patches and medium-frequency patches and then accumulated. The medium-frequency patches are obtained by extracting relatively high frequency bands from the low-resolution image. In example-based super-resolution, when super-resolution is applied to an input image that is a low-resolution image, a low-resolution patch is extracted from the input image, the frequencies of the extracted low-resolution patches are analyzed and then the low-resolution patch is converted into a medium frequency patch, the medium-frequency patch is collated with each pair in the constructed dictionary to select a more suitable pair, and the high-frequency patch of the selected pair is inserted at the same position in the input image that is the low-resolution image, so that the lost components are reproduced. By applying such processing to all patches, it is possible to convert the input low-resolution image into a high-resolution image.

Particularly, example-based super-resolution methods using basis sparse coding is attracting an attention because it makes it possible to obtain higher reproduction accuracy than that obtained with the above-described patch-based method. In this method, patches are not used directly, but a symbolic pattern referred to as a basis is generated from multiple patches to construct a dictionary in a scale smaller than that of the patch-based method. As in the case of the patch-based method, medium-frequency bases and the high-frequency bases have a correspondence relation. Upon super-resolution, in order to approximate the medium-frequency patches using a linear sum, a small number of medium-frequency bases and their corresponding coefficients are determined according to a coding algorithm. Such determination processing is referred to as sparse coding. Lastly, because medium-frequency bases and high-frequency bases have a correspondence relation, a high-frequency basis corresponding to the selected medium-frequency basis is multiplied by a coefficient and, using the resulting liner sum, a high-frequency patch is reproduced.

Recently, there is also a technology in which, in order to reduce the processing time, the distances each between patches of a pair of a high-resolution image and a low-resolution image obtained by deteriorating the high-resolution image are measured, the patches are classified into flat patches and non-flat patches other than the flat patches according to a set threshold, and the processing is performed on only the non-flat patches.

The above-described conventional technology however has a problem in that it is difficult to maintain a preferable relation between the reproduction accuracy and processing time. Specifically, because example-based super-resolution according to the conventional technology preforms reproduction processing per patch, there is a possibility that noise would be inserted when an appropriate high-resolution patch is not reproduced and thus the above-mentioned patch-based method requires a dictionary in which a large number of pairs of patches are accumulated. In example-based super-resolution using bases, the size of the dictionary is smaller than that of the patch-based super-resolution, but a dictionary in which a large number of pairs of bases are accumulated is still used. In the technology in which the processing is performed on only non-flat patches, an area to which super-resolution has been applied and an area to which super-resolution has not been applied are adjacent to each other at the boundary where the flat area and non-flat area are adjacent to each other, which may cause discontinuity and thus lead to visual artifacts. As a result, the conventional technology increases the processing load of searching the dictionary in which a large number of pairs of patches are accumulated to collate the patch with the pairs, and it is therefore difficult to describe that more preferable reproduction accuracy can be maintained. In other words, the reproduction accuracy and the processing time have the relation of trade-off, and it is preferable that it is possible to preferably control them according to the intended use.

In view of the above-described circumstances, there is a need to provide an image processing apparatus, an image processing method, and a computer-readable recording medium containing an image processing program that make it possible to maintain a preferable relation between the reproduction accuracy and processing time.

SUMMARY OF THE INVENTION

It is an object of the present invention to at least partially solve the problems in the conventional technology.

According to the present invention, there is provided an image processing apparatus comprising: a pre-processing unit that acquires, from an image, a patch obtained by extracting a partial area of the image; and a coding unit that determines a value of a design parameter relating to processing of the patch according to the amount of information contained in the acquired patch and representing a state of distribution of pixel values and generates a high-frequency patch from the patch by using the determined value of the design parameter.

The present invention also provides an image processing method comprising: acquiring, from an image, a patch obtained by extracting a partial area of the image; and determining a value of a design parameter relating to processing of the patch according to the amount of information contained in the acquired patch and representing a state of distribution of pixel values and generating a high-frequency patch from the patch by using the determined value of the design parameter.

The present invention also provides a non-transitory computer-readable recording medium that contains an image processing program that causes a computer to execute: acquiring, from an image, a patch obtained by extracting a partial area of the image; and determining a value of a design parameter relating to processing of the patch according to the amount of information contained in the acquired patch and representing a state of distribution of pixel values and generating a high-frequency patch from the patch by using the determined value of the design parameter.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a diagram of an exemplary relation between the amounts of characteristics of medium-frequency patches and frequency of the medium-frequency patches;

FIG. 23 is a flowchart of an exemplary flow of image processing according to the sixth embodiment;

DETAILED DESCRIPTION OF THE PREFERRED EMBODIMENTS

With reference to the accompanying drawings, embodiments of an image processing apparatus, an image processing method, and a computer-readable recording medium containing an image processing program according to the present invention will be described below. The following embodiments do not limit the invention. It is possible to combine the embodiments as appropriate without departing from the scope of the invention.

First Embodiment

Overview of Sparse Coding According to Embodiments

Figure 1:
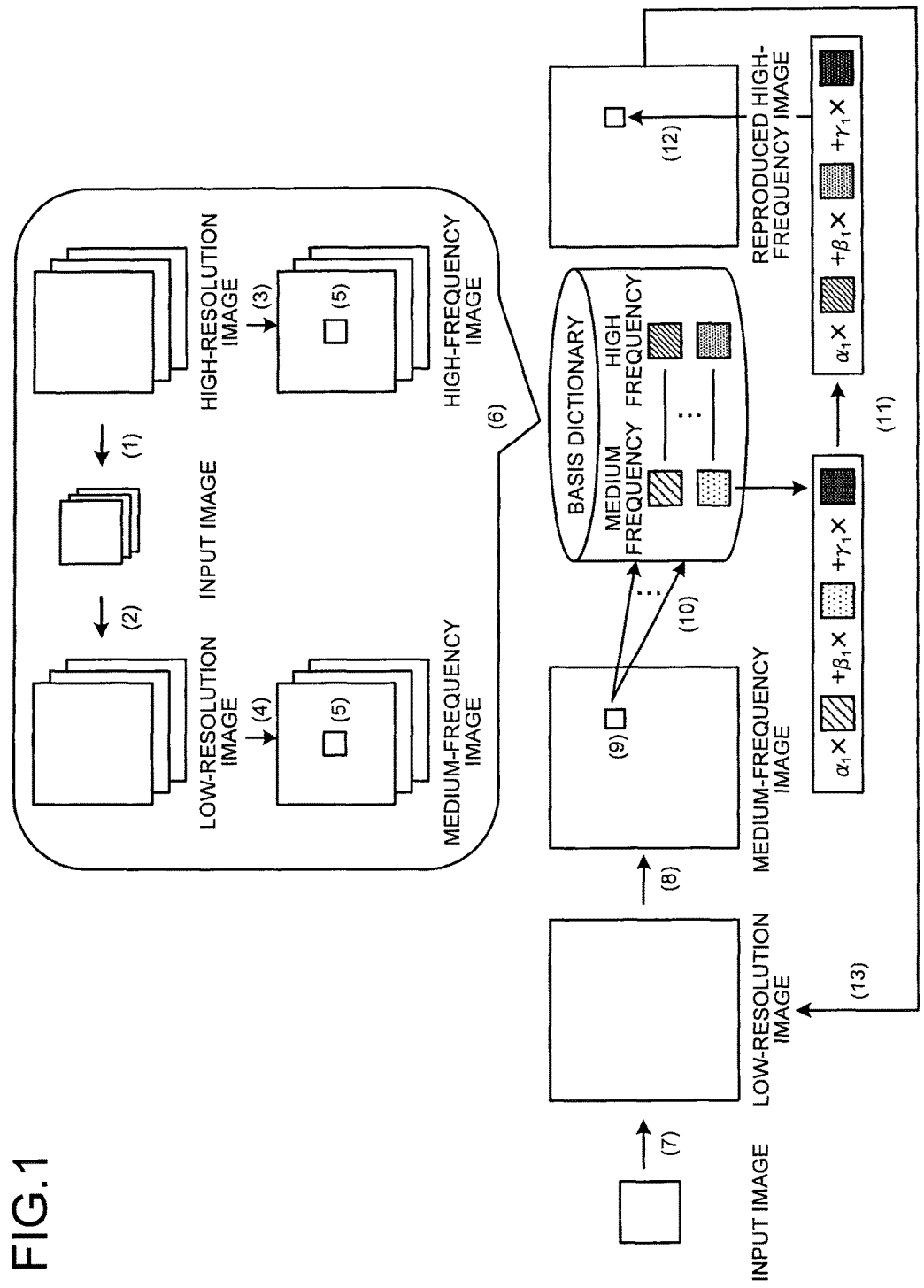
FIG. 1 is a diagram illustrating an overview of example-based super-resolution by basis sparse coding according to embodiments of the present invention.

Using FIG. 1, an overview of example-based super-resolution by basis sparse coding according to the embodiments will be described here. FIG. 1 is a diagram illustrating an overview of example-based super-resolution by basis sparse coding according to the embodiments. The example-based super-resolution by basis sparse coding according to the embodiments can be classified into a learning stage (corresponding to (1) to (6) in FIG. 1) at which a basis dictionary is constructed and a super-resolution stage (corresponding to (7) to (13) in FIG. 1) at which super-resolution is applied to an input image.

As illustrated in FIG. 1, at least one high-resolution image is prepared in advance in order to construct a basis dictionary. Pre-processing is then performed on the high-resolution image that is prepared in advance (see (1) to (5) in FIG. 1). For example, in the pre-processing, processing, such as color system transformation, input image generation, low-resolution image generation, high-frequency image generation, medium-frequency image generation, and patch extraction, is sequentially performed. Accordingly, a low-resolution image corresponding to a high-resolution image is generated. From among the processing, the color system transformation and medium-frequency image generation may be performed arbitrarily.

The color system transformation will be described here. When an image with a large number of channels, such as an RGB image, is input, the image can be used after converting the color system into, for example, a grayscale color system. Note that it is preferable that the color system of the image to be processed is the same between the learning stage and the super-resolution stage. For example, when the color system is transformed, a method of extracting only the brightness components and processing the components (processing on only one channel) is used. As the color system, for example, YIQ, YUV, and L*a*b are considered and, after the color system is transformed into each system, only the brightness components in each system are extracted. Furthermore, super-resolution processing may be performed independently per channel and the processed components may be integrated.

Input image generation will be described (see (1) in FIG. 1). From a high-resolution image obtained by the color system transformation, an input image equivalent in resolution to an image that is input by a user is generated. In general, a digital image is generated by sampling pixel values according to the degree of light intensity that is measured via an imaging device, such as a CCD or a CMOS of a camera or the like. It can be assumed that the digital image of a scene of the real world is generated through a process including blurring resulting from the motion of the camera, loss of information due to the sampling interval, and mixing of noise. A model obtained by modeling the process in which the digital image is generated is referred to as an image observation model, and a simulation is carried out using resolution conversion processing, such as a blur filter function and pixel interpolation. When the high-resolution image is compared to the real world, an input image is generated by simulating the blur by applying a Gaussian-filter that is one of smoothing filters and simulating the loss of information by bi-cubic interpolation. Accordingly, it is possible to preferably model the process through which the real image is obtained. The above-described observation model is an example only, and different filter functions or interpolation processing may be used as long as they allow more accurate simulations.

The low-resolution image generation will be described (see (2) in FIG. 1). The input image that is generated by deteriorating the high-resolution image according to the observation model is extended to the same size as that of the original high-resolution image to generate a low-resolution image. In general, interpolation technology is used for size conversion. By using, for example, bi-cubic interpolation from among the interpolation technologies, it is possible to maintain the smoothness of the edge. In addition to bi-cubic interpolation, a method such as nearest-neighbor interpolation or bi-linear interpolation may be adopted.

The high-frequency image generation will be described (see (3) in FIG. 1). A difference between a high-resolution image that is generated by color system transformation and a low-resolution image is calculated, to extract only the high-frequency components, and a high-frequency image is obtained. The difference between the high-resolution image and the low-resolution image refers to the difference in pixel value in the same position between two images having the same size. Thus, the value of common pixels between the images is zero and differences among pixels having different pixel values around the edge are calculated. In other words, in the high-resolution image, no frequency information is extracted in the flat area and only components with higher frequency (components effectual to super-resolution processing) can be extracted.

The Medium-frequency image generation will be described here (see (4) in FIG. 1). From the low-resolution image obtained by the low-resolution image generation, medium-frequency components are extracted to generate a medium-frequency image. Here, the medium-frequency components refer to, from among the frequency components remaining in the low-resolution image, components with relatively high frequencies. The image may be used in the state of low-resolution image; however, by extracting medium-frequency components of, for example, the edge having relatively high frequencies from among the low-resolution image, unnecessary information is removed. For example, because the flat area does not contain medium-frequency information, no change will be caused even if super-resolution is performed. This prevents the problem in that noise is inserted into the flat area. It is preferable that the images to be processed at the learning stage and the super-resolution stage are the same type of images. Descriptions will be given below, supposing that the low-resolution image has been converted into a medium-frequency image and the high-resolution image has been converted into a high-frequency image.

For example, the medium-frequency image is generated by using a method of performing a frequency analysis, such as the Fourier transform, to extract relatively high frequency components, or by calculating first and second derivations of a certain pixel with respect to surrounding pixels present in the horizontal and vertical direction with respect to the certain pixel. There is an alternative method of, for example, using a difference image between a low-resolution image and an image with more poor quality generated by deteriorating the low-resolution image.

The patch extraction will be described here (see (5) in FIG. 1). Pairs of patches are extracted from the high-frequency image and the medium-frequency image that are generated by performing the high-frequency image generation and medium-frequency image generation. The patches each correspond to a rectangular area in an arbitrary size. For example, small rectangular areas of about 5×5 pixels may be used for the patches. These patches do not necessarily have the same size, and they may be extracted such that the center positions (center positions in the images) correspond to the same sets of coordinates. After such patches are extracted, color system transformation and extraction of specific frequency components by frequency analysis may be performed. A patch of a medium-frequency image is referred to as a medium-frequency patch and a patch of a high-frequency image is referred to as a high-frequency patch. Patches are accumulated such that a medium-frequency patch and a high-frequency patch that are extracted from the corresponding positions in the medium-frequency image and the high-frequency image are in a pair.

Figure 2:
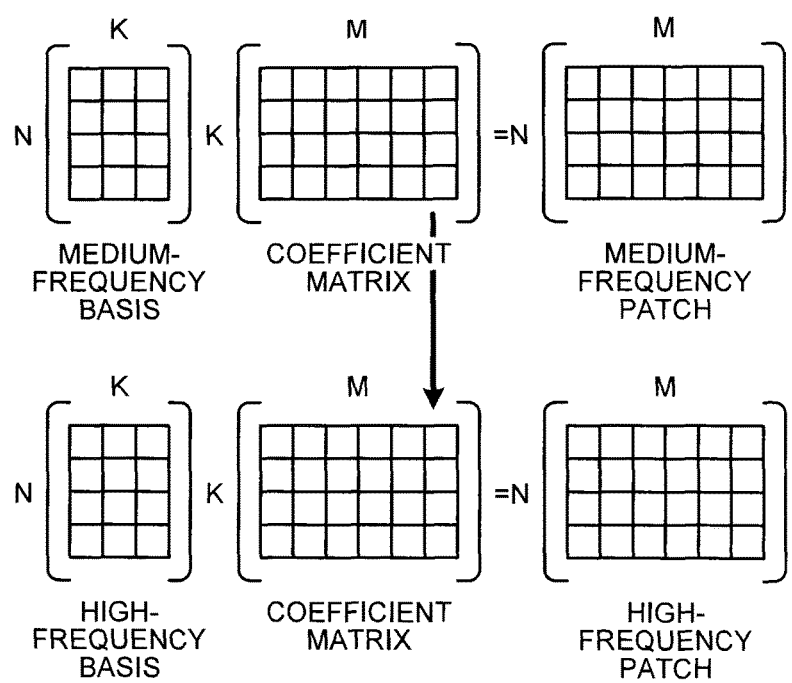
FIG. 2 is a diagram illustrating an exemplary construction of a basis dictionary according to the embodiments.

A basis dictionary is then constructed (see (6) in FIG. 1). For example, a basis dictionary is constructed using pairs of medium-frequency patches and high-frequency patches that are generated by the pre-processing. FIG. 2 is a diagram illustrating an exemplary construction of a basis dictionary according to the embodiment. FIG. 2 provides an illustration, supposing that medium-frequency patches and high-frequency patches are generated with their correspondence relation being maintained.

As for the matrices of medium-frequency patches and high-frequency patches that are shown on the right in FIG. 2, N representing the number of rows denotes the degree of high-frequency patches and M representing the number of columns denotes the number of extracted patches. Furthermore, K denotes the number of bases that should be constructed. In example-based super-resolution by basis sparse coding according to the embodiment, a coefficient matrix is determined on the basis of the medium-frequency patches and, by using the determined coefficient matrix in order to construct high-frequency bases, medium-frequency bases and a high-frequency bases are constructed with their correspondence relation being secured. The basis construction is performed according to the following algorithm (initializing the medium-frequency bases, performing coefficient coding, updating bases, repeating coefficient coding and updating bases, and constructing high-frequency bases).

Initialization of the medium-frequency bases will be described. For example, as for the medium-frequency bases of degree N (the medium frequency bases shown on the upper left in FIG. 2), the medium-frequency bases are initialized by determining values within a range of 0 to 255 at random and then converting each base into unit vectors. In the basis initialization, except for this random generation method, appropriate medium-frequency patches may be used for initial values. In a case where a target to which super-resolution is applied is determined in advance, medium frequency patches that are extracted from an image in the same category as that of the target to which super-resolution is applied may be used as initial values.

Coefficient coding will be described. For example, on the basis of the initialized medium-frequency bases and the medium-frequency patches, a coefficient matrix (the coefficient matrix shown at the upper center in FIG. 2) is constructed. According to the embodiment, the coding algorithm uses orthogonal matching pursuit. In orthogonal matching pursuit, for a certain medium frequency patch, initialization is performed using the initial residual as the patch. The basis which gives maximum scalar product with the residual vector, i.e., the basis which minimizes the resulting residual vector length is searched. The update is then carried out using the residual at that time as a new residual. By repeating those processes to search for multiple bases. The number of such bases to be selected is referred to as a sparse level. While the orthogonal matching pursuit is a greedy method that preferentially selects a component that is considered to be preferable, for example, to be close, and it is known as an algorithm with which a preferable result can be obtained. This processing is performed per medium-frequency patch to determine a coefficient matrix. In other words, when the number of patches is M, the processing is performed for M times independently.

updating of bases will be described here. For example, on the basis of the determined coefficient matrix and the medium-frequency patches, the bases (matrix) are updated. The update of bases is implemented by, for example, a K-SVD method. In the K-SVD method, when updating a certain basis, first, medium-frequency patches for which the basis is used in order for the expression using the linear sum when coded by orthogonal matching pursuit are collected. In other words, when sparse coding is applied to these collected medium-frequency patches, this basis is selected. From among the medium-frequency patches coded by orthogonal matching pursuit, the residual upon the approximate expression (linear sum) without this basis is calculated per medium frequency patch. For example, when coding is performed using three bases in the orthogonal matching pursuit, approximate vectors expressed using the two bases other than the basis to be updated and residual vectors of the original medium-frequency patch are calculated per medium-frequency patch. Thereafter, a basis that minimizes the residual vector lengths calculated per patch is recalculated by singular value decomposition. By performing this processing on all bases, bases for expressing the collected medium-frequency patches are constructed. FIG. 2 represents there are K bases.

The processing of repeating coefficient coding and basis updating will be described here. For example, the above-described coefficient matrix construction and basis (matrix) update are alternately performed repeatedly until the bases converge. When initial values are taken at random, the bases used for each medium-frequency patches change each time the bases are updated at the beginning. After the processing is repeated for tens of times, the bases to be used for the medium-frequency patches do not change and accordingly basis update is not performed. In other words, the bases used for the medium frequency patches converge into certain bases.

High-frequency basis construction will be described here. For example, high-frequency bases (the high-frequency bases shown on the lower left in FIG. 2) is constructed from the coefficient matrix constructed as described above and the high-frequency patches. When a dictionary used in example-based super-resolution is constructed, it is preferable that the components, such as medium-frequency and high-frequency patches and bases, have a correspondence relation. For this reason, by using the coefficient matrix used to construct medium-frequency bases is used to construct high-frequency bases, high-frequency bases maintaining the correspondence relation are reconstructed. It is possible to perform such processing by simple matrix calculations. For example, because the high-frequency bases shown in FIG. 2 are unknown and other two items are known, it suffices if a pseudo inverse matrix is calculated. By determining the coefficient matrix, multiple medium-frequency patches (patches for which coefficients are not 0) used to construct a certain medium-frequency basis are stored for the medium-frequency basis. Accordingly, according to non-logical interpretation of the pseudo inverse matrix calculation, collecting high-frequency patches corresponding to these medium-frequency patches and extracting common components construct corresponding high-frequency bases. In this manner, the medium-frequency bases and the high-frequency bases corresponding to the medium-frequency bases are generated.

According to the constructed basis dictionary, the processing of converting the input image into a system appropriate to the processing (see (7) to (9) in FIG. 1), the processing of performing super-resolution on the medium-frequency patches (see (10) to (12) in FIG. 1), and the processing of reproducing a high-resolution image corresponding to the input image (see (13) in FIG. 1) are performed sequentially. These sets of processing (the super-resolution stage at which super-resolution is applied to the input image) will be described in detail later.

Functional Configuration According to First Embodiment

Figure 3:
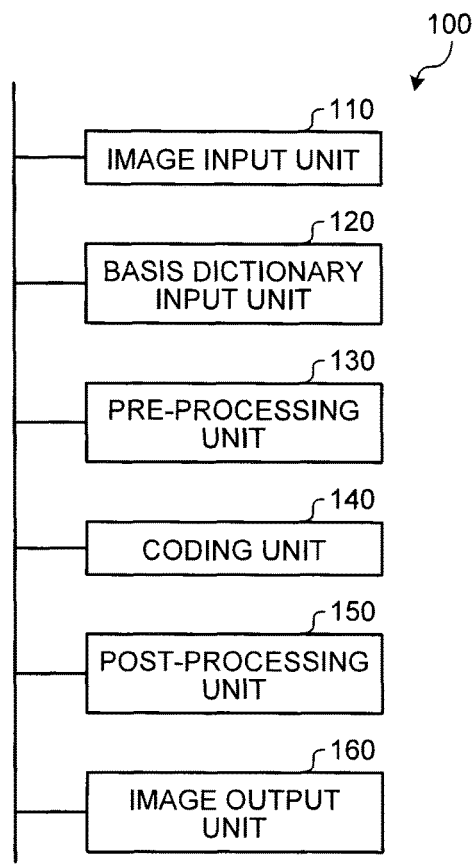
FIG. 3 is a block diagram of an exemplary functional configuration of an image processing apparatus according to a first embodiment of the present invention.

Using FIG. 3, the functional configuration of an image processing apparatus according to a first embodiment of the present invention will be described. FIG. 3 is a block diagram illustrating an exemplary functional configuration of the image processing apparatus according to the first embodiment.

As shown in FIG. 3, the image processing apparatus 100 includes an image input unit 110, a basis dictionary input unit 120, a pre-processing unit 130, a coding unit 140, a post-processing unit 150, and an image output unit 160. These units are connected with a bus and a part or all of the units may be implemented using software (a program) or implemented using a hardware circuit.

The image input unit 110 reads an input image to be processed. As for the input image, an image that is previously saved in a recording medium, such as a CD or a DVD, or a network storage, such as a HDD, may be read or an image that is generated by a device, such as a camera, may be used. The input image may be a low-resolution image. If the input image is a low-resolution image, the present invention will not involve an image size conversion process. In this case, the present invention can also be considered as a kind of texture edge reproduction technology. In the following descriptions, an input accompanying image size conversion by interpolation is assumed.

The basis dictionary input unit 120 reads a basis dictionary in which pairs of medium-frequency bases and high-frequency bases are stored. The basis dictionary may be previously described in, for example, a text file and read from, for example, a CD, DVD, or HDD, as the input image is read.

The pre-processing unit 130 converts the color system of the input image that is read by the image input unit 110 and extends the input image with a conventional interpolation technology to generate a low-resolution image (see (7) in FIG. 1). As described above, the color system is not necessarily converted, but, when the color system is converted, it is assumed to use a method of converting the color system into, for example, YIQ or L*a*b* and applying super-resolution to only Y components. Each channel may be processed independently and the results may be integrated at last. For example, nearest-neighbor interpolation, bi-linear interpolation, and bi-cubic interpolation are examples of the interpolation technology. The pre-processing unit 130 performs arbitrary pre-processing on the low-resolution image to generate a medium-frequency image (see (8) in FIG. 1). There are multiple medium-frequency image generation methods for medium-frequency image generation, but the same processing as that used to construct the basis dictionary is performed.

The pre-processing unit 130 extracts medium-frequency patches from the generated medium-frequency image (see (9) in FIG. 1). The patches to be extracted are in any size but in the same size as that of the medium-frequency bases. For example, the extraction of patches is performed in raster scan order. The patches may be extracted with some pixels overlapping, with the extraction interval less than the size of the patches, or may be extracted without such overlapping, with the extraction interval bigger than or equal to the size of the patches. Note that, because there is a possibility that discontinuity at the boundary of patches would occur when there are no overlaps between the patches, it is desirable that at least one pixel overlapped. The medium-frequency patches may be processed after all medium-frequency patches are extracted or super-resolution may be applied to the medium-frequency components as each patches are extracted.

The pre-processing unit 130 then measures the amount of characteristics of the extracted medium-frequency patches. As for the amount of characteristics, any measure can be used as long as, with the measure, the amounts of information contained in the patches can be quantified. It is generally assumed that patches with a significant change in pixel value have larger amounts of information than those of flat patches. Note that the user can define the amount of information, a threshold for determining whether the amount of information is large or small, etc. according to arbitrary standards. Descriptions will be provided below, supposing that the amount of characteristics is used in order to measure the amount of information and that the amount of information of patches with a greater change in pixel value is larger than that of flat patches. As for exemplary amounts of characteristics, a statistical measure, such as variance or the standard deviation, the amount of local characteristics, such as SIFT known as an image characteristics, edge characteristics extracted by CannyEdgeDetector can be considered in order to measure a variation between patches. Using a statistical measure, such as the standard deviation, as the amount of characteristics as described above makes it possible to calculate an amount of high-frequency components in the patch, etc. A combination of multiple types of amount of characteristics may be used. Note that the same types of amount of characteristics used to create a correspondence chart to be described later are used.

The coding unit 140 reads a correspondence chart that associates the amounts of characteristics of the medium-frequency patches extracted by the pre-processing unit 130 with the sparse levels. A sparse level refers to a processing intensity representing the number of selected bases stored in the basis dictionary. In other words, while the reproduction accuracy further increases as the sparse level increases, the number of times of collation with a basis pair in the dictionary increases and accordingly the processing time increases. The correspondence chart may be described in, for example, a text file and read from, for example, a CD, DVD, or HDD as the input image is read. The coding unit 140 sets a sparse level for each patch with reference to the correspondence chart according to the amount of characteristics measured by the pre-processing unit 130.

Figure 4:
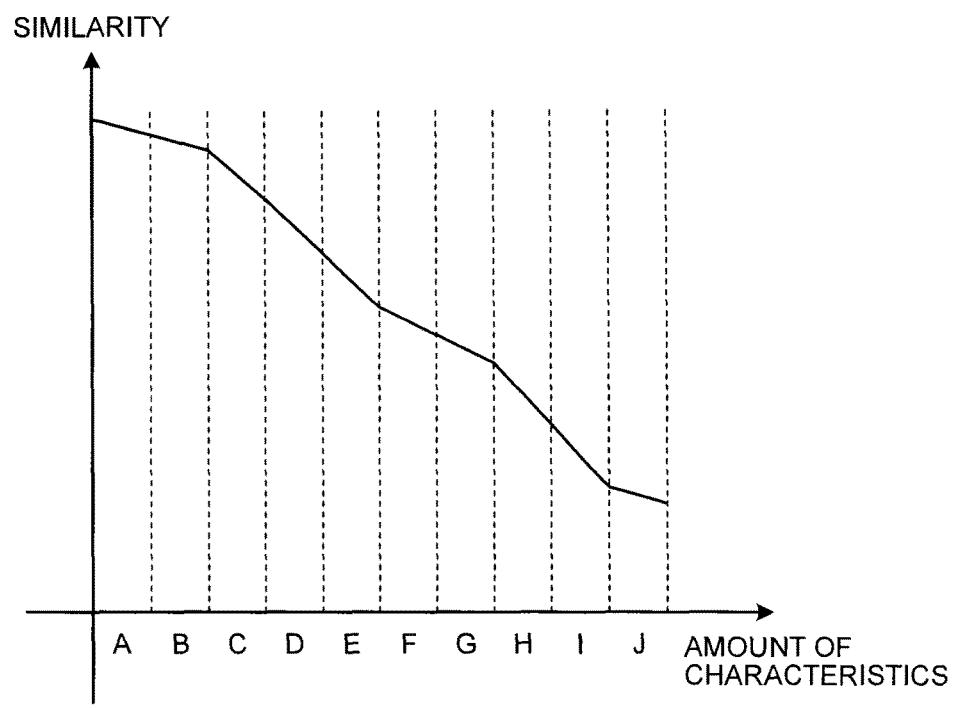
FIG. 4 is a diagram exemplifying a correspondence relation between the amounts of characteristics of medium-frequency patches and similarity between high-resolution patches and low-resolution patches.
Figure 5:
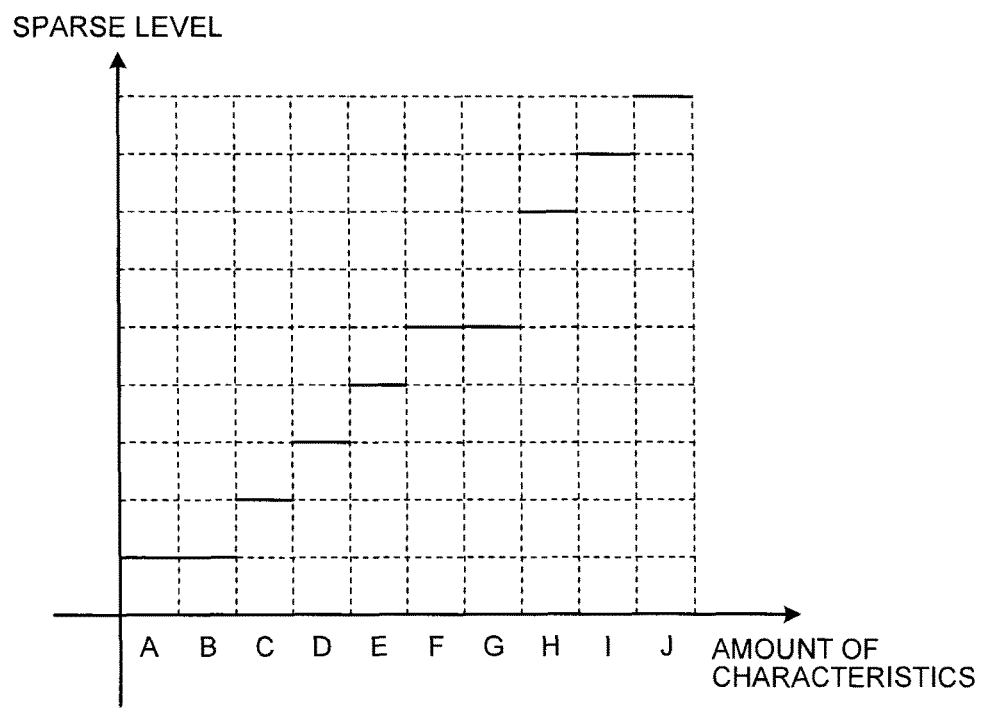
FIG. 5 is a diagram of an exemplary correspondence chart of the amounts of characteristics of medium-frequency patches and the sparse levels.

Using FIGS. 4 and 5, correspondence chart generation according to the first embodiment will be described here. FIG. 4 is a diagram exemplifying a correspondence relation between the amounts of characteristics of medium-frequency patches and similarity between high-resolution patches and low-resolution patches. FIG. 5 is a diagram of an exemplary correspondence chart of the amounts of characteristics of medium-frequency patches and the sparse levels.

It is possible to compare the amounts of characteristics according to the amounts of characteristics measured by the pre-processing unit 130 from the medium-frequency patches. Because it is possible, at the learning stage, to obtain pairs of high-resolution patches and low-resolution patches, it is possible to measure the similarity between patches. For example, FIG. 4 shows the result of measuring the amount of characteristics and similarity per patch and plotting them. The area is divided into 10 areas (A to J) and each area is treated. The areas A and B have high similarity, i.e., it is verified that they are areas with little deterioration between the high-resolution and low-resolution images (for example, an area that is originally flat). On the other hand, the areas I and J have low similarity, i.e., it is verified that they are areas with a lot of deterioration between the high-resolution and low-resolution images (for example, the edge or texture).

On the basis of the results, the correspondence chart shown in FIG. 5 can be generated. For example, as shown in FIG. 5, 10 is set for the upper limit of the sparse level and, according to the amount of characteristics, the areas are allocated to the levels other than the sparse levels 1 and 7. Because a sparse level represents the number of selected bases, sparse levels are given discretely. In the example shown in FIG. 5, the sparse level is further reduced for patches each with a smaller amount of characteristics and the sparse level is further increased for patches each with a larger amount of characteristics. In other words, as for patches each with a small amount of characteristics, the number of times of collation with the basis dictionary decreases and this leads to reducing of the processing time and, because of the small amount of characteristics, there is not much effect on the reproduction accuracy even if the sparse level is lowered. On the other hand, as for patches each with a large amount of characteristics, because the sparse level is further increased, preferable reproduction accuracy can be secured. In other words, it is possible to select an optimum sparse level at which unnecessary collation can be prevented compared to the conventional case where the sparse level is fixed. The correspondence chart shown in FIG. 5 is an example only. For example, two types of patches, i.e., flat patches and non-flat patches with an amount of information relatively larger than that of flat patches, may be defined and a correspondence chart for setting relatively higher sparse levels for non-flat patches than those for flat patches may be created. The correspondence chart may be multi-dimensional of three or more dimensions, not two-dimensional. In this case, because it is possible to determine the sparse level according to multiple types of amount of characteristics, it is possible to set more accurate values. According to the above descriptions, the amount of characteristics is used for the horizontal axis of the correspondence chart, but, because what measured using the amount of characteristics is the amount of information, the amount of information may be represented by the horizontal axis.

The following description refers back to FIG. 3. The coding unit 140 codes a medium-frequency patch according to the sparse level that is set according to the correspondence chart (see (10) to (12) in FIG. 1). Using a conventional coding algorithm, the medium-frequency patches are represented by approximation using a linear sum of the medium-frequency bases. Matching pursuit, orthogonal matching pursuit, etc. are taken as exemplary conventional coding algorithms. Using the coefficient and the high-frequency basis corresponding to the selected medium-frequency basis, the coding unit 140 generates a high-frequency patch according to the linear sum of them. The coding unit 140 performs the above-described processing on all the medium-frequency patches.

The post processing unit 150 generates a high-resolution image for the input image according to the high-frequency patches generated by the coding unit 140 (see (13) in FIG. 1). More specifically, the post-processing unit 150 reproduces a high-frequency image by stitching together the high-frequency patches generated by the coding unit 140. Because the medium-frequency patches are extracted according to an arbitrary extraction interval, they may overlap. If there is an area where multiple values overlap, the final pixel value of the area with the overlap may be obtained by averaging the overlapping values or weighted with an arbitrary method. The high-frequency patches are inserted at the same position as that of the extracted medium-frequency patches.

The post-processing unit 150 then generates a high-resolution image corresponding to the output image by adding the generated high-resolution image to the low-resolution image generated by the pre-processing unit 130. By adding the high-frequency image to the low-resolution image, the lost high-frequency components can be reproduced. In other words, the blurred edge can be corrected to be sharp and the lost fine structures can be produced. Without stitching together the reproduced high-frequency patches to reproduce a high-frequency image, the reproduced high-frequency patches may be directly added to the low-resolution image. When the pre-processing converts the color system of the input image, the post-processing unit 150 performs an inverse conversion to convert the color system of the reproduced high-resolution image into the original system. For example, when the RGB image is converted into YIQ and only Y components are processed, it suffices if, after three channels are integrated, an inverse conversion is performed to convert the image into a three-channel color image. When a grayscale image (one channel) is processed, inverse conversion is unnecessary.

The image output unit 160 outputs the high-resolution image reproduced by the post-processing unit 150. For example, the image output unit 160 can output the image directly to, for example, a recording medium, such as a CD, DVD, or HDD, or a display.

Flow of Image Processing According to First Embodiment

Figure 6:
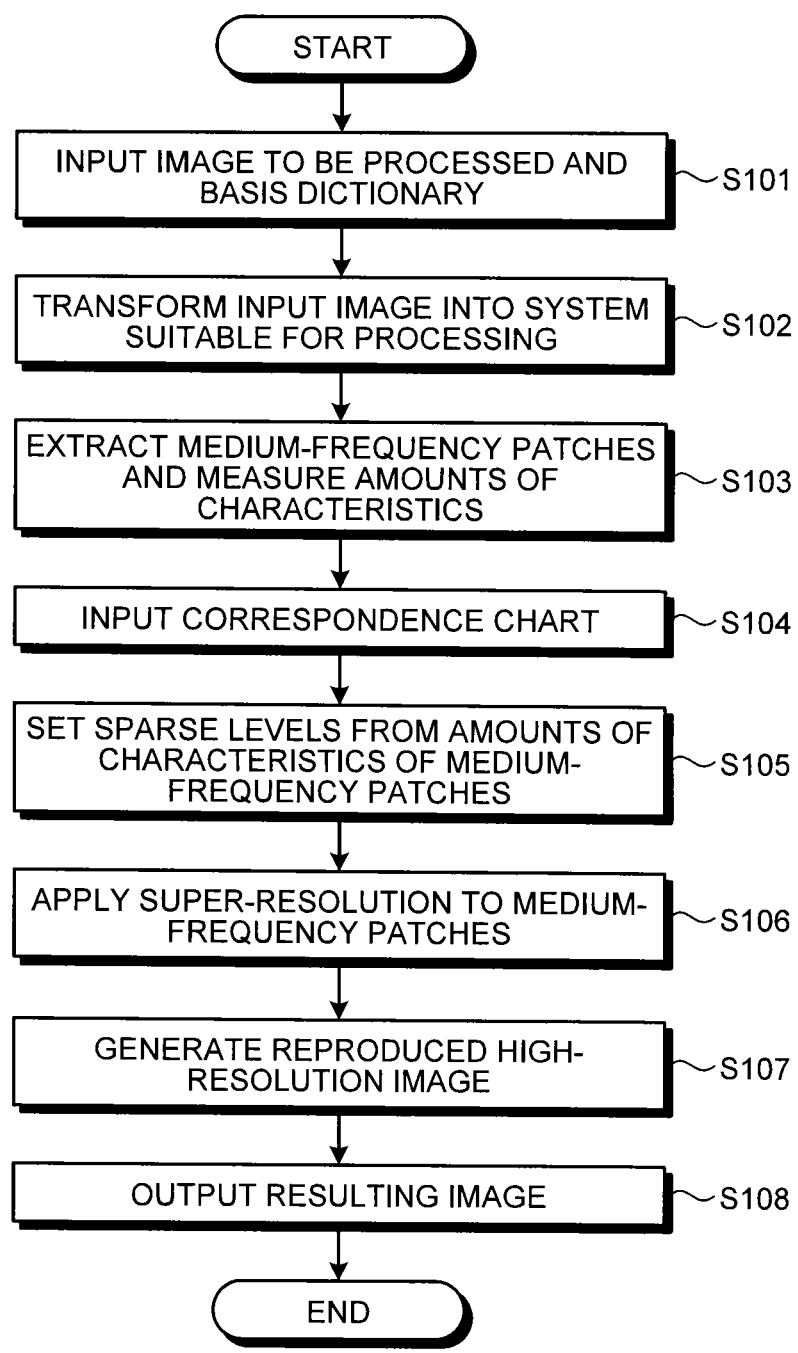
FIG. 6 is a flowchart of an exemplary flow of image processing according to the first embodiment.

Using FIG. 6, the flow of the image processing according to the first embodiment will be described here. FIG. 6 is a flowchart of an exemplary flow of the image processing according to the first embodiment.

As shown in FIG. 6, the image input unit 110 inputs an image to be processed and the basis dictionary input unit 120 inputs a basis dictionary in which pairs of medium-frequency bases and high-frequency bases are accumulated (step S101). The pre-processing unit 130 generates a low-resolution image by extending the input image input by the image input unit 110 by interpolation technology, and generates a medium-frequency image by performing arbitrary pre-processing on the low-resolution image (step S102). The pre-processing unit 130 extracts medium-frequency patches from the generated medium-frequency image and measures the amounts of characteristics of the extracted medium-frequency patches (step S103).

The coding unit 140 inputs a correspondence chart (step S104) and sets sparse levels according to the amounts of characteristics measured by the pre-processing unit 130 with reference to the correspondence chart (step S105). The coding unit 140 codes (applies super-resolution to) the medium-frequency patches according to the set sparse levels to generate high-frequency patches (step S106). The post-processing unit 150 reproduces a high-frequency image by stitching together the high-frequency patches generated by the coding unit 140 and reproduces a high-resolution image by adding the high-frequency image to the low-resolution image (step S107). The image output unit 160 outputs the high-resolution image that is reproduced by the post-processing unit 150 (step S108).

Advantage According to First Embodiment

The image processing apparatus 100 preferably sets sparse levels according to the correspondence chart between amounts of characteristics of the medium-frequency patches and sparse levels, which makes it possible to maintain a preferable relation between the reproduction accuracy and processing time. In other words, the image processing apparatus 100 can set preferable sparse levels according to the correspondence chart, which makes it is possible to maintain a more preferable relation between the reproduction accuracy and processing time than that obtained with the conventional technology in which the sparse level is fixed.

Second Embodiment

Functional Configuration According to Second Embodiment

Figure 7:
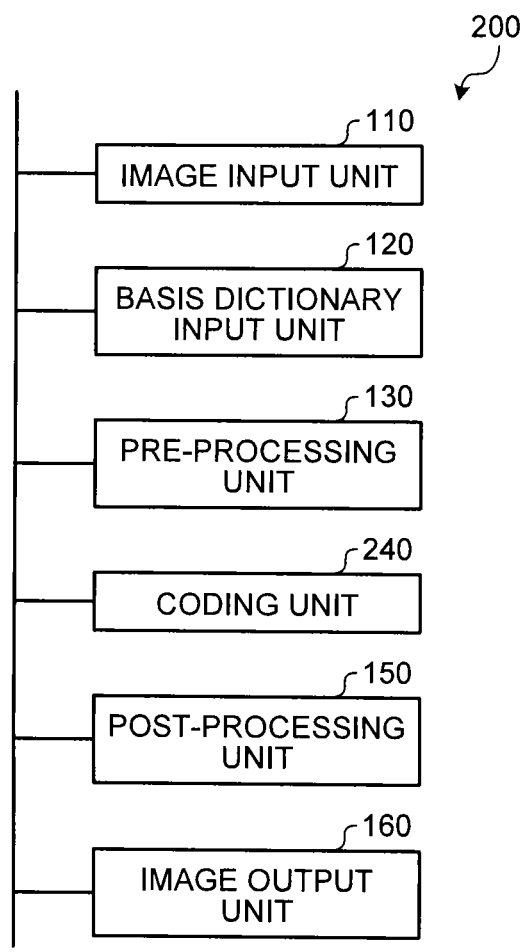
FIG. 7 is a block diagram of an exemplary functional configuration of an image processing apparatus according to a second embodiment of the present invention.

Using FIG. 7, the functional configuration of an image processing apparatus according to a second embodiment will be described. FIG. 7 is a block diagram of an exemplary functional configuration of the image processing apparatus according to the second embodiment. As for the second embodiment, the same reference numerals as those of the image processing apparatus 100 according to the first embodiment denote the same components as those of the image processing apparatus 100, and detailed descriptions for the same configuration may be omitted below.

As shown in FIG. 7, an image processing apparatus 200 includes the image input unit 110, the basis dictionary input unit 120, the pre-processing unit 130, a coding unit 240, the post-processing unit 150, and the image output unit 160. These units are connected with a bus and a part or all of the units may be implemented using software (a program) or implemented using a hardware circuit.

The coding unit 240 counts the amounts of characteristics of the medium-frequency patches extracted by the pre-processing unit 130 and creates a distribution of frequency of the amounts of characteristics. The frequency distribution is created using at least one type of amount of characteristics as in the case of the first embodiment. The frequency distribution may be created from all the medium-frequency patches in the image or may be created from a randomly-selected part of the medium-frequency patches. With respect to the frequency distribution, the coding unit 240 sets sparse levels to the amounts of characteristics according to the purpose. In other words, it suffices if it is assumed that the correspondence chart is created according to the shape of the frequency distribution and the purpose, such as prioritizing the processing speed or prioritizing the reproduction accuracy.

Figure 9A:
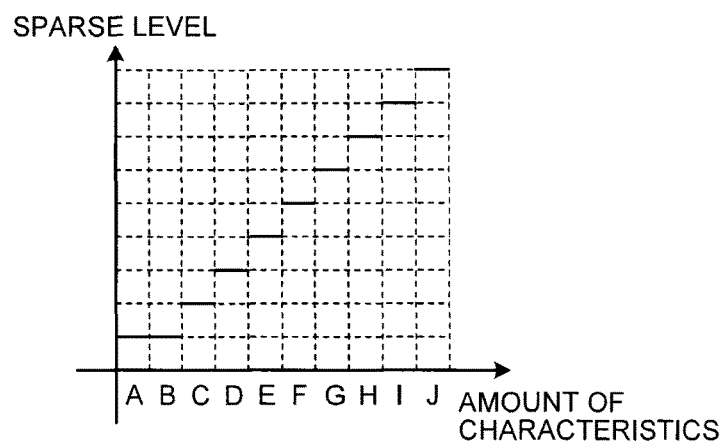
FIG. 9A is a diagram of an exemplary sparse level setting in a case where the reproduction accuracy is prioritized.
Figure 9B:
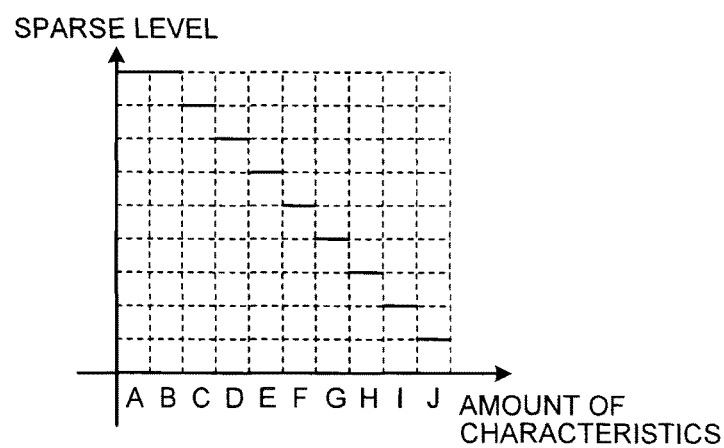
FIG. 9B is a diagram of an exemplary sparse level setting in a case where the processing time is prioritized.
Figure 9C:
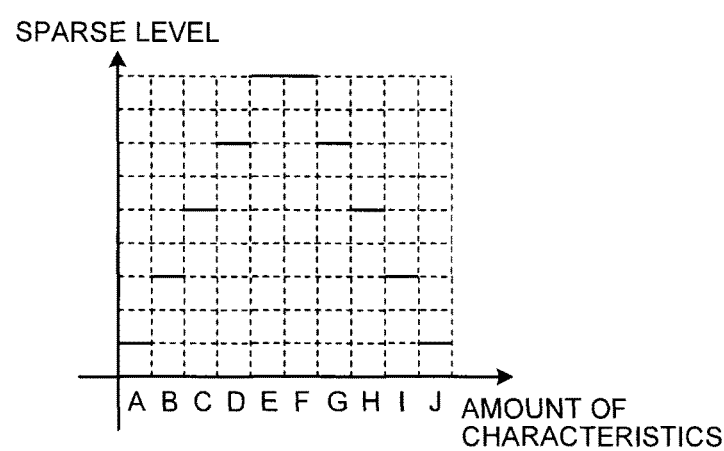
FIG. 9C is a diagram of an exemplary sparse level setting in a case where the middle between the reproduction accuracy shown in FIG. 9A and the processing time shown in FIG. 9B is taken.

FIG. 8 is a diagram of an exemplary relation between the amounts of characteristics of medium-frequency patches and frequency of the medium-frequency patches. FIG. 9A is a diagram of an exemplary sparse level setting in a case where the reproduction accuracy is prioritized. FIG. 9B is a diagram of an exemplary sparse level setting in a case where the processing time is prioritized. FIG. 9C is a diagram of an exemplary sparse level setting in a case where the middle between the reproduction accuracy shown in FIG. 9A and the processing time shown in FIG. 9B is taken.

It is assumed here that it is preferable to increase the intensity of super-resolution as the amount of characteristics increases. FIG. 8 shows the frequency distribution of the amount of characteristics created by measuring the amounts of characteristics of the medium frequency patches of an image. Supposing that the highest sparse level is 10, sparse levels corresponding to the amounts of characteristics are given according to the purpose or intended use. For example, when the reproduction accuracy is prioritized, as shown in FIG. 9A, the sparse level of a patch, such as an area J, for which it is preferable to set the intensity of super-resolution higher is not lowered as the situation allows and the sparse level of a patch, such as an area A or an area B, for which it is preferable to set the intensity of super-resolution lower is further lowered. In other words, according to FIG. 9A, the sparse level of an area where the frequency is relatively low is further lowered, which secures preferable reproduction accuracy.

When the processing time is prioritized, as shown in FIG. 9B, the sparse level of an area, such as an area J, where the frequency is relatively high is lowered as the situation allows. In other words, according to FIG. 9B, the sparse level of an area where the frequency is relatively high is lowered, which reduces the processing time. When the trade-off between the reproduction accuracy and processing time is considered, as shown in FIG. 9C, the balance between the reproduction accuracy and processing time is secured by setting higher the intensity of super-resolution to, for example, the area E and the area F. The coding unit 240 uses the correspondence charts shown in FIGS. 9A to 9C according to the purpose or intended use. As for the purpose or intended use, it suffices if, for example, the user inputs in advance parameters representing the degree of priority of the reproduction accuracy and the processing time and sparse levels in the correspondence chart are set according to the parameters. Other types of processing performed by the coding unit 240 are the same as those performed by the coding unit 140 according to the first embodiment. The correspondence charts shown in FIGS. 9A to 9C are examples only.

In general, the processing time is the result of multiplying the processing time required per patch by the number of patches. The processing time required per patch is proportional to the sparse level, i.e., the reproduction accuracy. In other words, according to the second embodiment, it is possible to preferably control the processing time and reproduction accuracy that have the relation of trade-off according to the purpose or intended use.

Flow of Image Processing According to Second Embodiment

Figure 10:
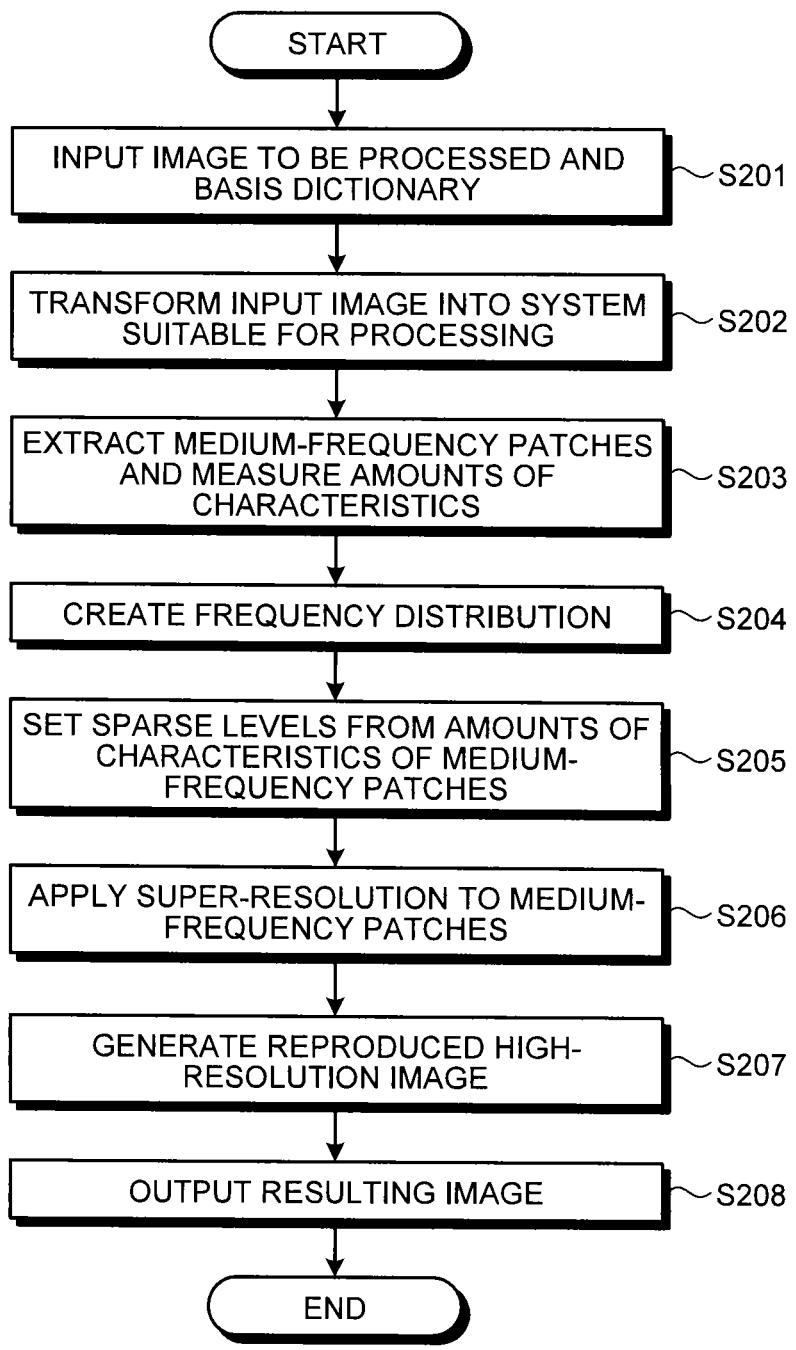
FIG. 10 is a flowchart of an exemplary flow of the image processing according to the second embodiment.

Using FIG. 10, the flow of image processing according to the second embodiment will be described here. FIG. 10 is a flowchart of an exemplary flow of the image processing according to the second embodiment. Descriptions may be omitted below for the same steps as those of the flow of the image processing according to the first embodiment. Specifically, the processing at steps S201 to S203 is the same as the processing at steps S101 to S103. The processing at steps S206 to S208 is the same as the processing at steps S106 to S108.

As shown in FIG. 10, the coding unit 240 counts the amounts of characteristics measured by the pre-processing unit 130 and creates a distribution of frequency of the amounts of characteristics (step S204). According to the purpose or intended use, the coding unit 240 sets sparse levels corresponding to the amounts of characteristics according to the created frequency distribution (step S205).

Advantage According to Second Embodiment

The image processing apparatus 200 creates a correspondence chart based on the distribution of frequency of the amounts of characteristics of the medium-frequency patches and, according to the correspondence chart, preferably sets sparse levels, which makes it possible to reduce the processing costs for medium-frequency patches for which the sparse level is set low and thus reduce the whole processing time. Furthermore, because it is possible to process an area with a large amount of characteristics at a higher sparse level, it is possible to improve the reproduction accuracy.

Third Embodiment

Functional Configuration of Third Embodiment

Figure 11:
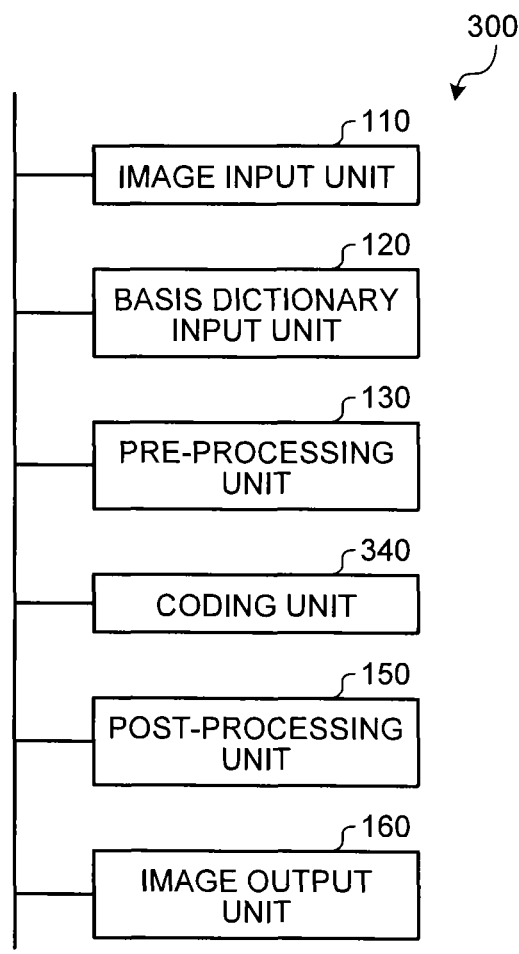
FIG. 11 is a block diagram of an exemplary functional configuration of an image processing apparatus according to a third embodiment of the present invention.

Using FIG. 11, the functional configuration of an image processing apparatus according to a third embodiment of the present invention will be described. FIG. 11 is a block diagram of an exemplary functional configuration of the image processing apparatus according to the third embodiment. As for the third embodiment, the same reference numerals as those of the image processing apparatus 100 according to the first embodiment denote the same components as those of the image processing apparatus 100, and detailed descriptions for the same configuration may be omitted below.

As shown in FIG. 11, an image processing apparatus 300 includes the image input unit 110, the basis dictionary input unit 120, the pre-processing unit 130, a coding unit 340, the post-processing unit 150, and the image output unit 160. These units are connected with a bus and a part or all of the units may be implemented using software (a program) or implemented using a hardware circuit.

On the basis of a change in the amount of characteristics of medium-frequency patches extracted by the pre-processing unit 130, the coding unit 340 determines whether a medium-frequency patch is a flat patch or any other patch. When there is no change in the amount of characteristics, the medium frequency patch is a flat patch and, when there is a change in amount of characteristics, the medium frequency patch is a non-flat patch. It suffices if whether a medium-frequency patch is a flat patch or a non-flat patch would be determined using a pre-set threshold. Because only whether a medium-frequency patch is a flat patch or a non-flat patch is determined, it suffices if only the amount of change in the pixel value is measured. According to the determination on whether the medium-frequency patch is a flat patch or a non-flat patch, the coding unit 340 sets different sparse levels. For example, when the medium-frequency patch is a flat patch, the coding unit 340 sets an arbitrary sparse level (e.g., a value smaller than the pre-set default value). On the other hand, when the medium-frequency patch is a non-flat patch, the coding unit 340 sets a sparse level that is the pre-set default level (it suffices even if the value is larger than the value given to flat patches).

Flow of Image Processing According to Third Embodiment

Figure 12:
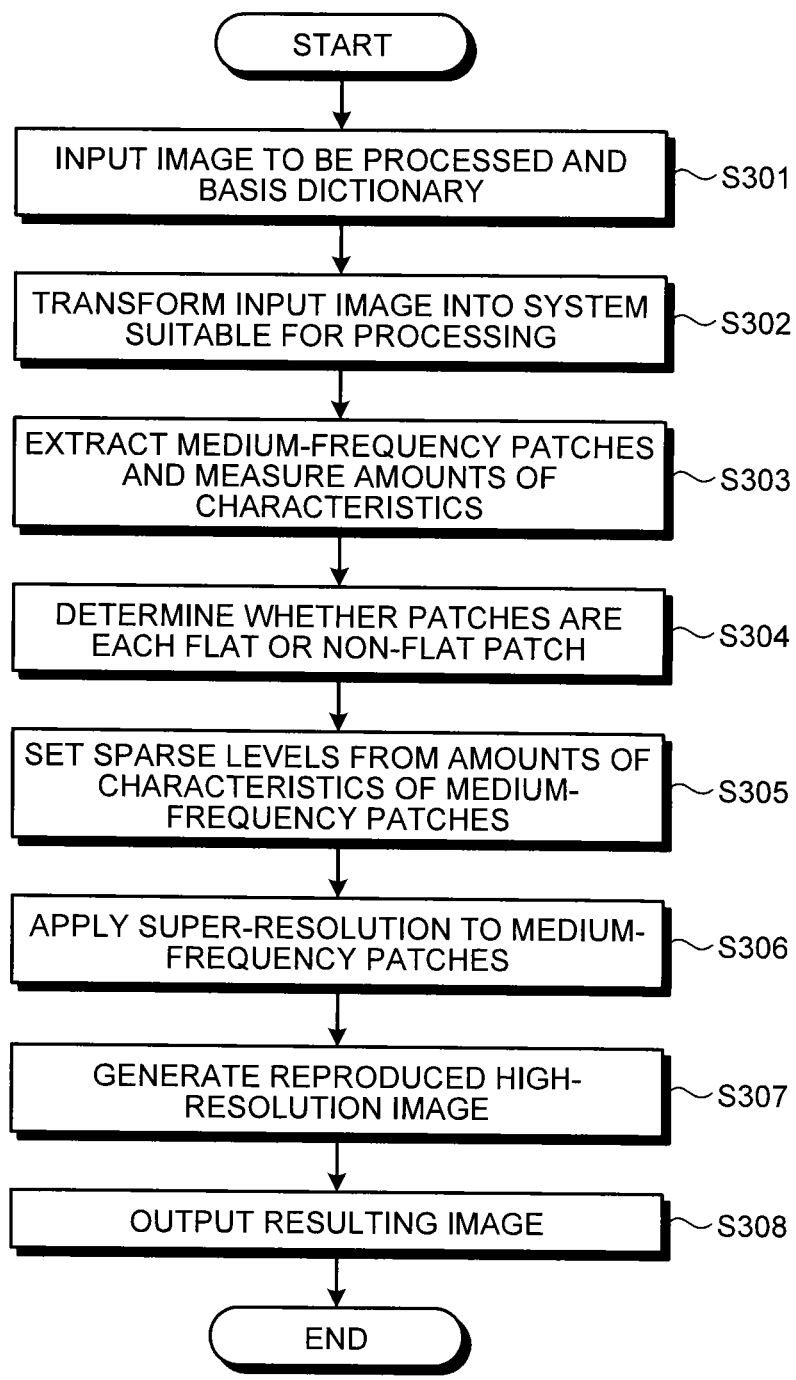
FIG. 12 is a flowchart of an exemplary flow of image processing according to the third embodiment.

Using FIG. 12, a flow of image processing according to the third embodiment will be described here. FIG. 12 is a flowchart of an exemplary flow of the image processing according to the third embodiment. Descriptions may be omitted below for the same steps as those of the flow of the image processing according to the first embodiment. Specifically, the processing at steps S301 to S303 is the same as the processing at steps S101 to S103. The processing at steps S306 to S308 is the same as the processing at steps S106 to S108.

As shown in FIG. 12, on the basis of the change in the amount of characteristics measured by the pre-processing unit 130, the coding unit 340 determines whether medium-frequency patches are each a flat patch or a non-flat patch (step S304). It suffices if the pre-set threshold is used to determine whether a medium-frequency patch is a flat patch or a non-flat patch. For example, a patch having the standard deviation equal to or smaller than the threshold is determined as a flat patch. When a medium-frequency patch is a flat patch, the coding unit 340 sets a lower sparse level and, when a medium-frequency patch is a non-flat patch, the coding unit 340 sets a sparse level higher than that given to the flat patch (step S305).

Advantage According to Third Embodiment

The image processing apparatus 300 determines whether a medium-frequency patch is a flat patch or a non-flat patch on the basis of a change in the amount of the medium-frequency patch, sets a lower sparse level when the medium-frequency patch is a flat patch, and sets a sparse level higher than the level given to the flat patch given when when the medium-frequency patch is a flat patch. As a result, the image processing apparatus 300 can reduce a probability that a non-preferable sparse level is given, non-preferable sparse level is not given and, according to this, which makes it possible to improve the reproduction accuracy and also reduce the processing time.

Fourth Embodiment

Functional Configuration According to Fourth Embodiment

Figure 13:
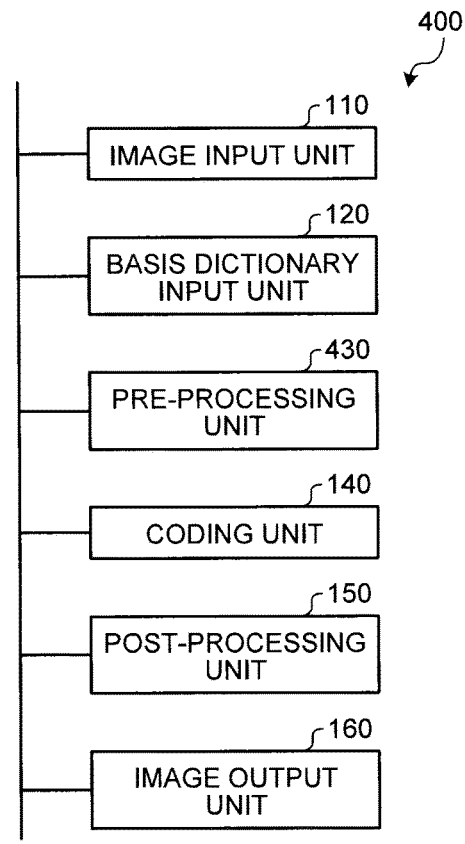
FIG. 13 is a block diagram of an exemplary functional configuration of an image processing apparatus according to a fourth embodiment of the present invention.

Using FIG. 13, the functional configuration of an image processing apparatus according to a fourth embodiment will be described. FIG. 13 is a block diagram of an exemplary functional configuration of the image processing apparatus according to the fourth embodiment. As for the fourth embodiment, the same reference numerals as those of the image processing apparatus 100 according to the first embodiment denote the same components as those of the image processing apparatus 100, and detailed descriptions for the same configuration may be omitted below.

As shown in FIG. 13, an image processing apparatus 400 includes the image input unit 110, the basis dictionary input unit 120, a pre-processing unit 430, the coding unit 140, the post-processing unit 150, and the image output unit 160. These units are connected with a bus and a part or all of the units may be implemented using software (a program) or implemented using a hardware circuit.

The pre-processing unit 430 arranges, on a medium-frequency image, two extraction windows for extracting medium-frequency patches from the medium-frequency image, regards areas contained in the respective extraction windows as medium-frequency patches, and measures their amounts of characteristics. The pre-processing unit 430 extracts medium-frequency patches at an extraction interval to be described below according to the purpose or intended use. The larger the amount of characteristics is, the larger the amount of information is.

For example, when the processing time is prioritized and when the amounts of characteristics in the two extraction windows are smaller than a predetermined threshold, the pre-processing unit 430 extracts medium-frequency patches from these extraction windows. In other words, the interval at which patches are extracted increases. On the other hand, when the reproduction accuracy is prioritized and when the amounts of characteristics in the two extraction windows are equal to or larger than the predetermined threshold, the pre-processing unit 430 arranges an arbitrary number of extraction sub-windows such that they are contained in these two extraction windows and extracts medium-frequency patches from all windows including the extraction sub-windows. Also as for the patches according to the above-described embodiments, it suffices if it is assumed that windows are arranged and medium-frequency patches are extracted from the windows. In order to make the processing easy to understand, the processing is described here intentionally as two-stage processing of arranging windows on sets of coordinates to be extracted and extracting pixel values from them.

Figure 14A:
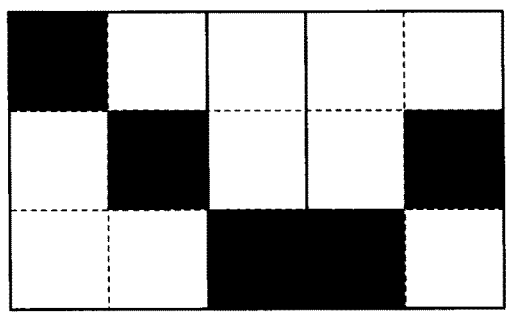
FIG. 14A is a diagram illustrating an exemplary extraction of medium-frequency patches in a case where the extraction interval is further reduced.
Figure 14B:
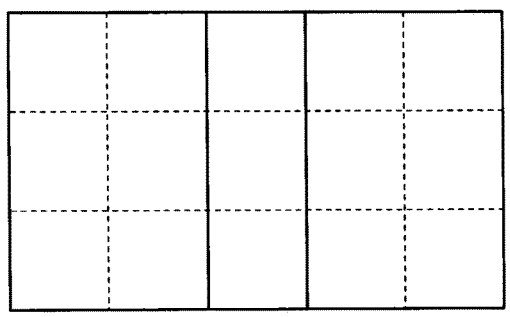
FIG. 14B is a diagram illustrating an exemplary extraction of medium-frequency patches in a case where the extraction interval is further increased.
Figure 15:
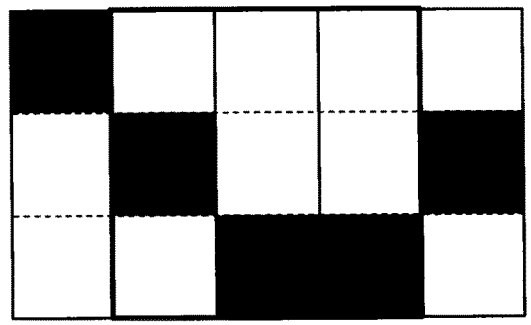
FIG. 15 is a diagram illustrating exemplary extraction of medium-frequency patches in a case where an extraction sub-window is arranged.

FIG. 14A is a diagram illustrating an exemplary extraction of medium-frequency patches in a case where the extraction interval is further reduced. FIG. 14B is a diagram illustrating an exemplary extraction of medium-frequency patches in a case where the extraction interval is further increased. FIG. 15 is a diagram illustrating exemplary extraction of medium frequency patches in a case where an extraction sub-window is arranged.

FIGS. 14A, 14B and 15 take an exemplary case where the patch size is 3 (3×3) and the extraction interval is 2. In FIGS. 14A, 14B and 15, patches of extraction windows are represented by solid lines, a rectangle in a dotted line represents a patch, and black rectangle represents that there is information. Because the extraction interval is "2" for the patch size of "3", the patches of the extraction windows are superimposed at the center part of the whole rectangles. The patch of the extraction sub-widow is represented by the thick solid line.

In general, when super-resolution is performed with the reduced patch extraction interval, many high-frequency components overlap, which reduces the effect of noise. In the example shown in FIG. 14A, the amount of information contained in adjacent patches is large, which increases the possibility that noise is contained when super-resolution is applied s. On the other hand, in the example shown in FIG. 14B, adjacent patches are flat patches, which lowers the possibility that noise is contained when super-resolution is performed. In the example shown in FIG. 14A, reducing the extraction interval increases the number of high-frequency components overlapping at one pixel and accordingly, when the high-frequency components are averaged at last, it is possible to reduce the effect of noise and reproduce more accurate high-frequency components. In the example of FIG. 14B, increasing the extraction interval can avoid extraction of waste patches and accordingly it is possible to reduce the processing time as a whole.

Furthermore, two extraction windows are arranged so as to reduce the number of overlaps, the amounts of characteristics in the two extraction windows are measured, the area is regarded as an area with a small amount of information when the measured amounts of characteristics are smaller than a predetermined threshold, and medium frequency patches are extracted from these positions. Two extraction windows may be arranged such that high-frequency components do not overlap. On the other word, when the measured amounts of characteristics are equal to or larger than the threshold, as shown in FIG. 15, an extraction sub-window is arranged such that the extraction sub-window is contained in the two extraction windows. When the extraction sub-window shown in FIG. 15 is arranged, three patches (black three rectangles) are extracted in total.

Any value can be set for the threshold that determines whether there is information. For example, an extraction sub-window may be arranged when even one of the two windows has an amount of characteristics equal to or larger than the threshold, or an extraction sub-window may be arranged when each of both the two windows have amounts of characteristics equal to or larger than the threshold. Whether the amount of characteristics is large or small may be determined after windows are arranged over the image. The number of extraction sub-windows to be arranged can be determined arbitrarily. Multiple methods can be considered as the method of extracting medium-frequency patches. For example, because an image is a two-dimensional image, two or more windows are arranged in the horizontal and vertical directions and patches are extracted in the same manner as that of the above-described method. Alternatively, one extraction window may be used. When one extraction window is used, the extraction window is moved at a pre-set extraction interval and, if the amount of information is small, patch extraction may be skipped and the extraction window may be moved to the next position to repeat the processing.

Flow of Image Processing According to Fourth Embodiment

Figure 16:
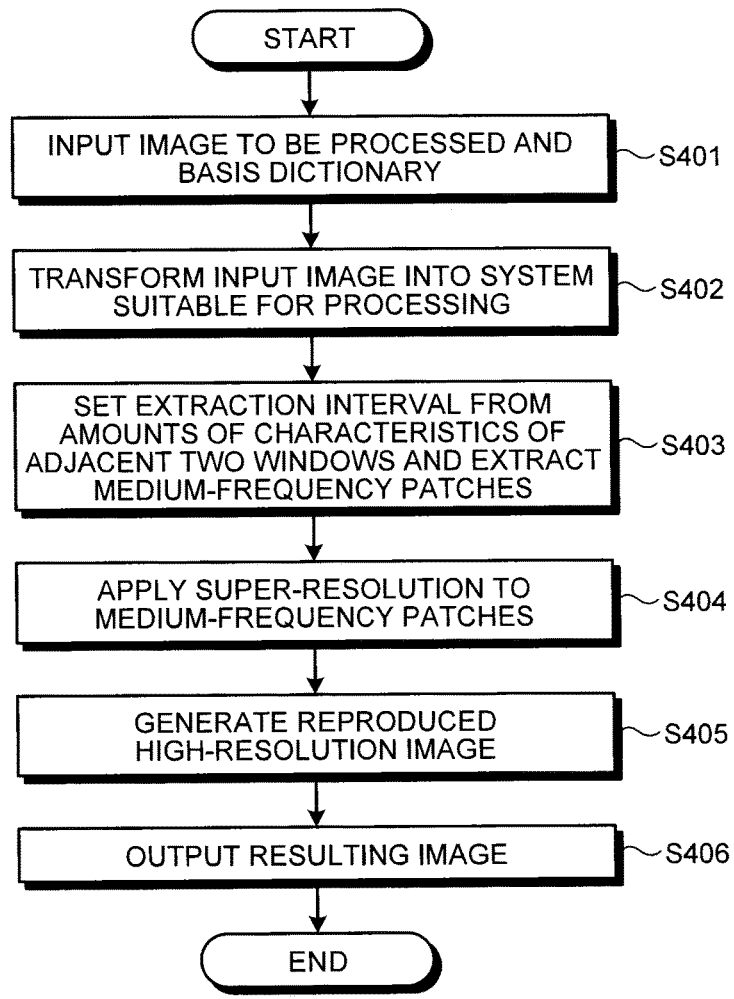
FIG. 16 is a flowchart of an exemplary flow of image processing according to the fourth embodiment.

Using FIG. 16, the flow of image processing according to the fourth embodiment will be described. FIG. 16 is a flowchart of an exemplary flow of the image processing according to the fourth embodiment. Descriptions may be omitted below for the same steps as those of the flow of the image processing according to the first embodiment. Specifically, the processing at steps S401 and S402 is the same as the processing at steps S101 and S102. The processing at steps S404 to S406 is the same as the processing at steps S106 to S108.

As shown in FIG. 16, the pre-processing unit 430 arranges two adjacent extraction windows on a generated medium frequency image, sets an extraction interval according to the amounts of characteristics contained in the respective extraction windows, and extracts medium-frequency patches (step S403).

Advantage According to Fourth Embodiment

The image processing apparatus 400 increases the extraction interval for an area with a smaller amount of characteristics and processes the area, which makes it possible to reduce the number of patches to be extracted and accordingly reduce the processing time. Furthermore, the image processing apparatus 400 reduces the extraction interval for an area with a large amount of characteristics and processes the area, which makes it possible to reduce the effect of noise and accordingly improve the reproduction accuracy.

Fifth Embodiment

Functional Configuration According to Fifth Embodiment

Figure 17:
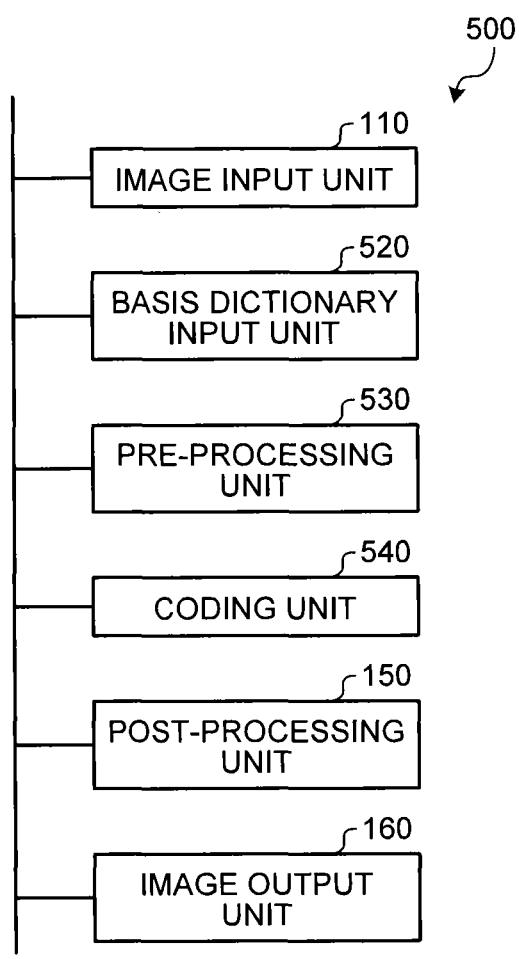
FIG. 17 is a block diagram of an exemplary functional configuration of an image processing apparatus according to a fifth embodiment of the present invention.

Using FIG. 17, the functional configuration of an image processing apparatus according to a fifth embodiment of the present invention will be described. FIG. 17 is a block diagram of an exemplary functional configuration of the image processing apparatus according to the fifth embodiment. As for the fifth embodiment, the same reference numerals as those of the image processing apparatus 100 according to the first embodiment denote the same components as those of the image processing apparatus 100, and detailed descriptions for the same configuration may be omitted below.

As shown in FIG. 17, an image processing apparatus 500 includes the image input unit 110, a basis dictionary input unit 520, a pre-processing unit 530, a coding unit 540, the post-processing unit 150, and the image output unit 160. These units are connected with a bus and a part or all of the units may be implemented using software (a program) or implemented using a hardware circuit.

The basis dictionary input unit 520 reads dictionaries of bases in different sizes. The number of dictionaries to be read is at least one, and dictionaries corresponding in number to the types of patch size to be used at the latter step are prepared. Note that the basis dictionaries may be collectively described in one text file or may be written in multiple text files separately. Alternatively, any system, such as binary file, may be used for the basis dictionaries as long as they are computer-readable dictionaries.

The pre-processing unit 530 extracts medium-frequency patches in different patch sizes according to the following purpose or intended use. For example, when the processing time is prioritized, the pre-processing unit 530 extracts medium-frequency patches in a patch size equal to or larger than a predetermined size from an area with a small amount of information (area with an amount of information smaller than a predetermined threshold). When the reproduction accuracy is prioritized, the pre-processing unit 530 extracts medium-frequency patches in a patch size equal to or smaller than the predetermined size from an area with a large amount of information (area with an amount of information equal to or larger than the predetermined threshold). A combination of both of them may be used or any one of them may be used according to the purpose. The patch size may be uniquely determined according to the amount of characteristics using a correspondence chart. After extracting medium-frequency patches, the pre-processing unit 530 may repeatedly perform processing of extracting smaller patches contained in the medium-frequency patches.

The coding unit 540 performs super-resolution using the medium-frequency patches extracted by the pre-processing unit 530. According to the patch sizes of medium-frequency patches used by the pre-processing unit 530, the coding unit 540 selects and uses basis dictionaries in which bases in the same size as that of the medium-frequency patches are accumulated.

Figure 18A:
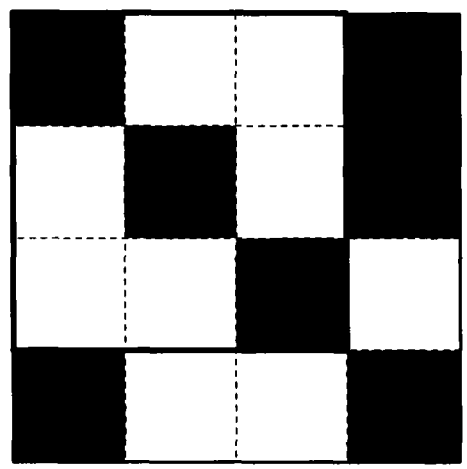
FIG. 18A is a diagram of an exemplary patch containing an amount of information equal to or larger than a predetermined threshold.
Figure 18B:
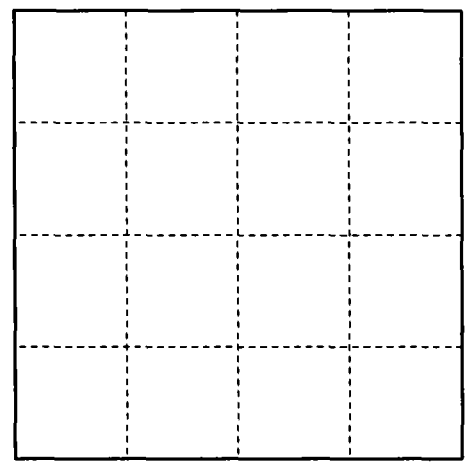
FIG. 18B is a diagram of an exemplary patch containing an amount of information smaller than the predetermined threshold.

FIG. 18A is a diagram of an exemplary patch containing an amount of information equal to or larger than the predetermined threshold. FIG. 18B is a diagram of an exemplary patch containing an amount of information smaller than the predetermined threshold. Because the patch shown in FIG. 18A has a more complicated shape, the patch size is reduced as represented by the thick solid line to simplify the structure and then super-resolution is performed. For example, in the example shown in FIG. 18A, the patch size is changed from "4" to "3". Reducing the patch size can further simplify the fine structure, which allows accurate reproduction.

Because the patch shown in FIG. 18B is a flat patch containing no information, super-resolution processing is performed with unchanged patch size or a larger patch size. For example, in the example shown in FIG. 18B, it suffices if any one of large sizes of "4" to "15" etc. is set for the patch size and used. In other words, reducing the size of a patch with a large amount of information can further increase the reproduction accuracy, and increasing the size of a patch with a small amount of information can further reduce the processing time. As described above, basis dictionaries corresponding to patch sizes are prepared in advance according to the patch sizes to be used.

As described in the embodiments, the processing time is the result of multiplying the processing time required per patch by the number of patches. The processing time required per patch is proportional to the sparse level, i.e., the reproduction accuracy. In addition to this, the number of patches is determined according to the patch size and the extraction interval. In other words, according to the fifth embodiment, according to the purpose or intended use, it is possible to preferably control the processing time and reproduction accuracy that have the relation of trade-off.

Flow of Image Processing According to Fifth Embodiment

Figure 19:
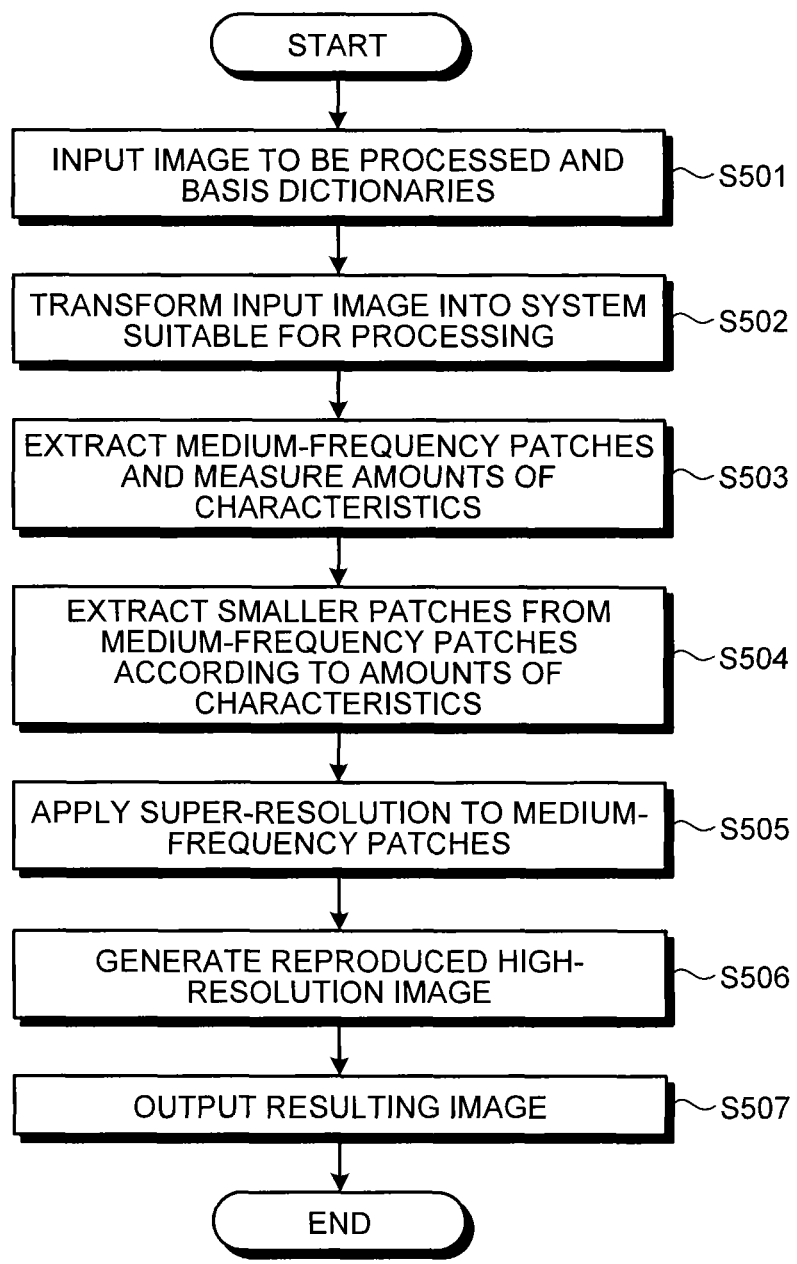
FIG. 19 is a flowchart of an exemplary flow of image processing according to the fifth embodiment.

Using FIG. 19, the flow of the image processing according to the fifth embodiment will be described here. FIG. 19 is a flowchart of an exemplary flow of image processing according to the fifth embodiment. Descriptions may be omitted below for the same steps as those of the flow of the image processing according to the first embodiment. Specifically, the processing at steps S502 and S503 is the same as the processing at steps S102 and S103. The processing at steps S506 and S507 is the same as the processing at steps S107 and S108.

As shown in FIG. 19, the basis dictionary input unit 520 reads dictionaries of bases in different sizes that correspond in number to the types of patch size to be used at the latter step (step S501). According to the amount of characteristics, the pre-processing unit 530 changes the patch size and extracts medium-frequency patches from the medium-frequency image (step S504). The coding unit 540 applies super-resolution to the medium-frequency patches according to the basis dictionaries correspond to the patch sizes used by the pre-processing unit 530 (step S505).

Advantage According to Fifth Embodiment

The image processing apparatus 500 further increases, for an area with a smaller amount of information, the patch size to increase the extraction interval and then processes the area, which makes it possible to reduce the number of patches to be extracted and accordingly reduce the processing time. Furthermore, the image processing apparatus 500 processes an area with a larger amount of information using a smaller patch, which makes it possible to simplify fine structures to allow accurate reproduction and accordingly improve the reproduction accuracy.

Sixth Embodiment

Functional Configuration of Sixth Embodiment

Figure 20:
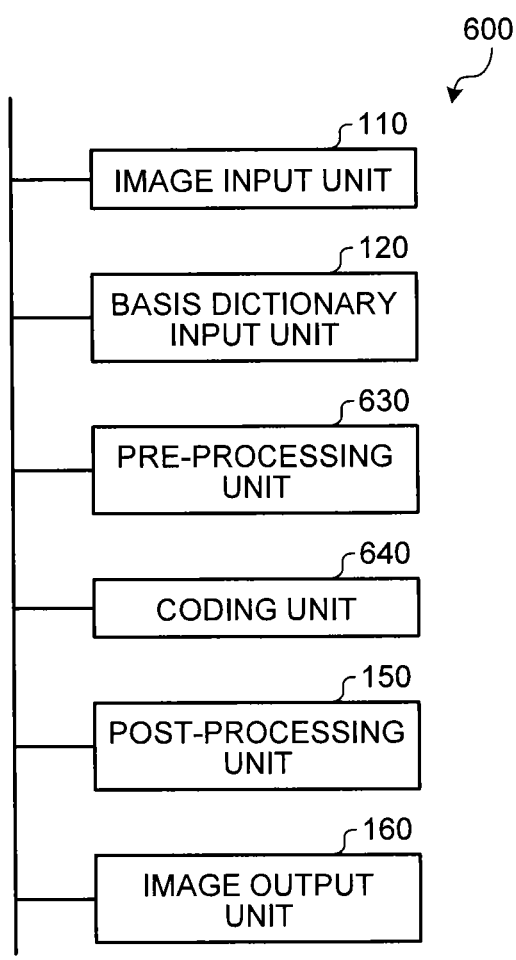
FIG. 20 is a block diagram of an exemplary functional configuration of the image processing apparatus according to a sixth embodiment of the present invention.

Using FIG. 20, a functional configuration of an image processing apparatus according to a sixth embodiment will be described here. FIG. 20 is a block diagram of an exemplary functional configuration of the image processing apparatus according to the sixth embodiment. As for the sixth embodiment, the same reference numerals as those of the image processing apparatus 100 according to the first embodiment denote the same components as those of the image processing apparatus 100, and detailed descriptions for the same configuration may be omitted below.

As shown in FIG. 20, an image processing apparatus 600 includes the image input unit 110, the basis dictionary input unit 120, a pre-processing unit 630, a coding unit 640, the post-processing unit 150, and the image output unit 160. These units are connected with a bus and a part or all of the units may be implemented using software (a program) or implemented using a hardware circuit.

The pre-processing unit 630 extracts medium-frequency patches according to an extraction interval that is set by the coding unit 640. For example, the pre-processing unit 630 extracts a medium-frequency patch at an extraction interval equal to or larger than the predetermined value from an area with a small amount of information (an area with an amount of information lower than a predetermined threshold). On the other hand, the pre-processing unit 630 extracts a medium-frequency patch at an extraction interval equal to or smaller than the predetermined value from an area with a large amount of information (an area with an amount of information equal to or larger than the predetermined threshold). As described above, the extraction interval is increased or reduced based on the predetermined value according to whether the amount of information is large or small. Based on the extraction interval that is set according to the amount of information of the medium-frequency patch extracted the last time, the interval at which a medium-frequency patch is extracted this time may be set. For example, in the case where the extraction interval set the last time is "3", an extraction interval equal to or smaller than "3" can be set when the amount of information of the medium-frequency patch extracted this time is large, and an extraction interval equal to or larger than "3" can be set when the amount of information of the medium-frequency patch extracted this time is small. As for the following descriptions, it is assumed that the extraction interval is increased or reduced not based on the extraction interval that is set the last time but based on the predetermined value.

When the measured amount of information is equal to or larger than the predetermined threshold, the coding unit 640 sets the extraction interval equal to or smaller than the predetermined value. When the measured amount of information is smaller than the predetermined threshold, the coding unit 640 sets the extraction interval equal to or larger than the predetermined value. For example, when the amount of information of the medium-frequency patch that is measured by the pre-processing unit 630 is equal or larger than the predetermined threshold (if the amount of information is large), the coding unit 640 assumes that further fine super-resolution should be performed and sets the extraction interval equal to or smaller than the predetermined value. On the other hand, when the amount of information of the medium-frequency patch that is measured by the pre-processing unit 630 is smaller than the predetermined threshold (the amount of information is small), the coding unit 640 assumes that further fine super-resolution is unnecessary and sets the extraction interval equal to or larger than the predetermined value. The extent to which the extraction interval is increased or reduced may be determined in advance or may be determined according to whether the amount of information is large or small.

Figure 21A:
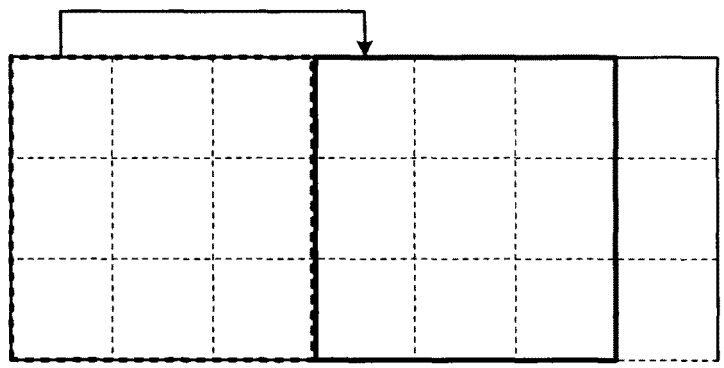
FIG. 21A is a diagram illustrating an exemplary extraction interval setting according to the sixth embodiment.
Figure 21B:
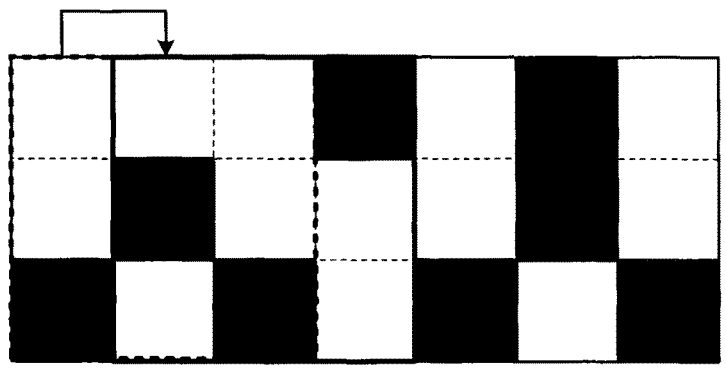
FIG. 21B is a diagram illustrating another exemplary extraction interval setting according to the sixth embodiment.

FIGS. 21A and 21B are diagrams illustrating exemplary extraction interval settings according to the sixth embodiment. In FIGS. 21A and 21B, each extracted medium-frequency is represented as a rectangular area in a dotted line and each medium-frequency patch extracted at an extraction interval that is set according to whether the amount of information of the medium-frequency parch is large or small is represented as a rectangular area in a solid line.

According to the method shown in FIG. 21A, when the amount of information of a medium-frequency patch is smaller than a predetermined threshold, it is determined that it is a patch with a small amount of information and sets the extraction interval equal to or larger than a predetermined value. For example, when the predetermined value of extraction interval is "2" and when the above-described condition is met, the extraction interval is set at "3". In this case, while the amount by which the extraction interval is increased may be any value, it is preferable that an overlap is accompanied so as to avoid discontinuity in the processing results between adjacent patches. According to the example shown in FIG. 21A in which the patch size is "3×3", when the predetermined value of extraction interval is "2" and when the above-described condition is met, the extraction interval is set at "2" so as to accompany an overlap. Thereafter, a medium-frequency patch is extracted from the position moved according to the set extraction interval and super-resolution processing is performed.

According to the method shown in FIG. 21B, when the amount of information of a medium-frequency patch is equal to or larger than a predetermined threshold, it is determined that it is a patch with a large amount of information and the extraction interval is set equal to or smaller than a predetermined value. For example, when the predetermined value of extraction interval is "2" and when the above-described condition is met, the extraction interval is set at "1". In this case, the amount by which the extraction interval is reduced may be any value as long as the extraction interval is equal to the minimum value of "2" or larger and may be determined according to the amount of information equal to or larger than the threshold. According to the example shown in FIG. 21B in which the patch size is "3×3", when the predetermined value of extraction interval is "2" and when the above-described condition is met, the extraction interval is set at "2" when the amount of information is "3" and the extraction interval is set at "1" when the amount of information is "6". Thereafter, a medium-frequency patch is extracted from the position moved according to the set extraction interval and super-resolution processing is performed. The extraction interval may be set arbitrarily according to the amount of information using the correspondence chart as in the case of the first embodiment. In such a case, it suffices if a correspondence chart with the horizontal axis representing the amount of information and the vertical axis representing the extraction interval is created. As for the amount of information, it is possible to use a combination of arbitrary types.

The pre-processing unit 630 further measures the amount of information of a surrounding medium-frequency patch obtained by extracting a surrounding area representing an area that partially overlaps with a partial area of an image, an area adjacent to the partial area, or an area distant from the partial area by a pixel or more. The pre-processing unit 630 then extracts a medium-frequency patch according to the extraction interval set by the coding unit 640. The pre-processing unit 630 sets at least one surrounding medium-frequency patch representing an area that partially overlaps with an area from which a medium-frequency patch is to be extracted, an area adjacent to the area, or an area distant from the area by a pixel or more and measures the amount of information of the medium-frequency patch and the at least one surrounding medium-frequency patch.

The pre-processing unit 630 extracts a medium-frequency patch at an extraction interval equal to or larger than the predetermined value from an area with a small amount of information, and the pre-processing unit 630 extracts a medium-frequency patch at an extraction interval equal to or smaller than the predetermined value from an area with a large amount of information. The extraction interval may be set according to the amount of information of the medium-frequency patch and the surrounding medium-frequency patch that are measured by the pre-processing unit 630. The extraction interval is increased or reduced on the basis of the predetermined value according to whether the amount of information is large or small. Based on the extraction interval that is set according to the amount of information of the medium-frequency patch and the surrounding medium-frequency patch extracted the last time, the interval at which a medium-frequency patch is extracted this time may be set.

When the measured amount of information of the medium-frequency patch and the surrounding medium-frequency patch is equal to or larger than the given threshold, the coding unit 640 sets the extraction interval equal to or smaller than the predetermined value. When the measured amount of information is smaller than the given threshold, the coding unit 640 sets the extraction interval equal to or larger than the predetermined value. For example, when the amount of information of the medium frequency patch and the surrounding medium-frequency patch measured by the pre-processing unit 630 is equal to or larger than the predetermined threshold (the amount of information is large), the coding unit 640 assumes that further fine super-resolution should be performed and sets the extraction interval and sets the extraction interval equal to or smaller than the predetermined value. On the other hand, when the amount of information of the medium-frequency patch and the surrounding medium-frequency patch that is measured by the pre-processing unit 630 is smaller than the predetermined threshold (the amount of information is small), the coding unit 640 assumes that further fine super-resolution is unnecessary and sets the extraction interval equal to or larger than the predetermined value. When two or more patches are used, an extraction interval may be set based on the amount of information of all the patches or may be set based on the amount of information of an arbitrary number of patches. The extent to which the extraction interval is increased or reduced may be determined in advance or may be determined according to whether the amount of information is large or small.

Figure 22A:
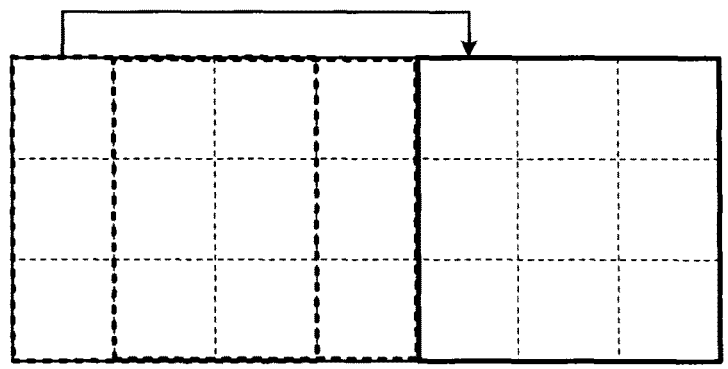
FIG. 22A is a diagram illustrating still another exemplary extraction interval setting according to the sixth embodiment.
Figure 22B:
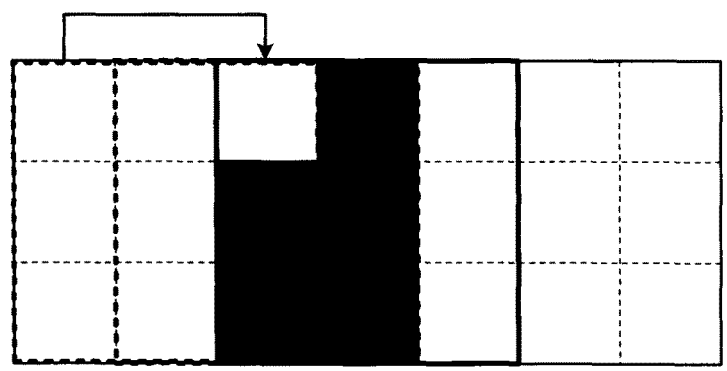
FIG. 22B is a diagram illustrating still another exemplary extraction interval setting according to the sixth embodiment.

FIGS. 22A and 22B are diagrams illustrating still other extraction interval exemplary settings according to the sixth embodiment. According to FIGS. 22A and 22B take an exemplary case where a surrounding medium-frequency patch is set in a position distant from a medium-frequency patch by only one pixel (they overlap). In FIGS. 22A and 22B, an extracted medium-frequency patch and a surrounding medium-frequency patch are represented as the rectangular areas in the dotted lines and a medium-frequency patch that is extracted at a set extraction interval is represented as the rectangular area in the solid line. The extracted medium-frequency patch corresponds to the rectangular area in the dotted-line represented on the left.

According to the method shown in FIG. 22A, when the amount of information of a medium-frequency patch and a surrounding medium-frequency patch is smaller than a predetermined threshold, it is determined that it is a patch with a small amount of information and the extraction interval is set equal to or larger than a predetermined value. For example, when the predetermined value of extraction interval is "3" and when the above-described condition is met, the extraction interval is set at "4". Thereafter, a medium-frequency patch is extracted from the position moved according to the set extraction interval and super-resolution processing is performed.

According to the method shown in FIG. 22B, when the amount of information of a medium-frequency patch and a surrounding medium-frequency patch is equal to or larger than the threshold, it is determined that it is a patch with a large amount of information and sets the extraction interval equal to or smaller than a predetermined value. For example, when the predetermined value of extraction interval is "3" and when the above-described condition is met, the extraction interval is set at "2". Thereafter, a medium-frequency patch is extracted from the position moved according to the set extraction interval and super-resolution processing is performed. In the example shown in FIG. 22B, there is an advantage in that, when a patch is in a position over the edge, it is prevented that the extraction interval is set equal to or larger than the predetermined value because the amount of contained information is small. Specifically, in the example shown in FIG. 22B, because the amount of information of the medium-frequency patch is "2", there is a risk that, with the amount of information of only the medium-frequency patch, it is determined that the amount of information is small and accordingly the extraction interval is set equal to or larger than the predetermined value. If the amount of information of the surrounding medium-frequency patch of "5" is taken into account, it is determined that the amount of information is large and thus it can be prevented that the extraction interval is set equal to or larger than the predetermined value. Accordingly, even when there is a patch in a position over the edge, it is possible to assuredly determine an area on which super-resolution should be performed. The surrounding medium-frequency may be arranged rightward or leftward with respect to the medium-frequency patch or may be arranged in any direction (upward, downward, etc.).

Flow of Image Processing According to Sixth Embodiment

Using FIG. 23, a flow of image processing according to the sixth embodiment will be described. FIG. 23 is a flowchart of an exemplary flow of the image processing according to the sixth embodiment. Descriptions may be omitted below for the same steps as those of the flow of the image processing according to the first embodiment. Specifically, the processing at steps S601 and S602 is the same as the processing at steps S101 and S102. The processing at steps S604 to S606 is the same as the processing at steps S106 to S108.

As shown in FIG. 23, the pre-processing unit 630 extracts medium-frequency patches each at a set extraction interval and the coding unit 640 sets extraction intervals each on the basis of the amount of information of a medium-frequency patch or on the basis of, in addition to the amount of information of the medium-frequency patch, the amount of information of a surrounding medium-frequency patch (step S603).

Advantage According to Sixth Embodiment

Because the image processing apparatus 600 sets the extraction interval for a medium-frequency patch to be extracted next according to the amount of information of a medium-frequency patch, it is possible to increase the extraction interval for an area with a small amount of information and process the area so that the number of patches can be reduced that should be processed, which allows fast processing. The image processing apparatus 600 reduces the extraction interval for an area with a large amount of information and processes the area, which makes it possible to reduce the effect of noise and accordingly reproduce fine structures more accurately. Furthermore, the image processing apparatus 600 sets the extraction interval for a medium-frequency patch to be extracted next according to the amount of information of a medium-frequency patch and a surrounding medium-frequency patch, which makes it possible to prevent that the extraction interval is erroneously set large when the patch is in a position over the edge and set an advantageous extraction interval.

Seventh Embodiment

The embodiments of the image processing apparatus according to the invention have been described; however, the image processing apparatus may be carried out in various different modes in addition to the above-described embodiments. Different Embodiments of (1) determination of design parameters, (2) configuration, and (3) program will be described.

(1) Determination of Design Parameters

The above-described embodiments are described as the case where the values of design parameters including the sparse level, extraction interval, and patch size are determined independently. As for the design parameters, the value of at least one design parameter may be determined at the same time according to the measured amount of information or at least one type of amount of characteristics.

Figures 24, 25:
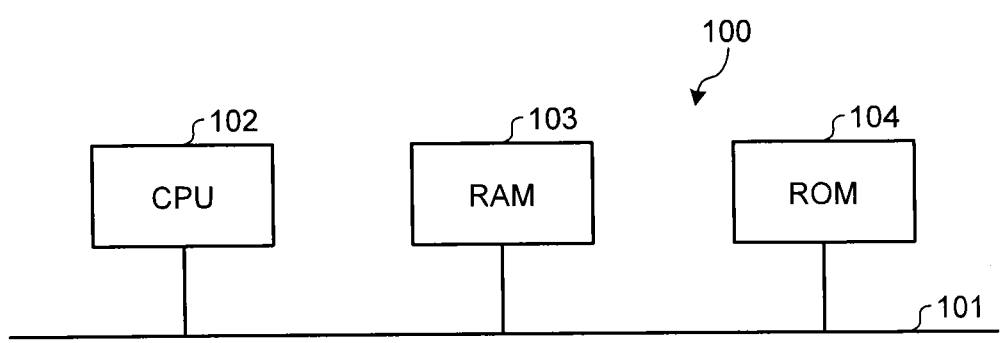
FIG. 24 is a diagram of an exemplary correspondence table with which the values of multiple design parameters are determined at the same time.
FIG. 25 is a diagram of an exemplary hardware configuration of the image processing apparatus.

FIG. 24 is a diagram of an exemplary correspondence table with which values of multiple design parameters are determined at the same time. As shown in FIG. 24, it is possible to determine the values of multiple design parameters at the same time using the correspondence table that defines the values of respective design parameters for the range of amount of characteristics ((1) to (10) in FIG. 24). Note that, because it suffices if a correspondence table of parameters required to be determined at the same time, three types of parameters are not necessarily required. As for the range of amount of characteristics, the user can define any range. As for the amount of characteristics, it is possible to use a combination of multiple types of amount of characteristics. The values of parameters may be determined not with the correspondence table but with functions. In other words, any method can be used as long as it uniquely determines at least one parameter for at least one type of amount of characteristics.

(2) Configuration

The process procedures, the control procedures, specific names, information including various types of data and various parameters mentioned in the description and drawings can be changed as required unless otherwise specified. The constituent elements of the apparatuses are merely conceptual and are not necessarily physically resemble the structures shown in the drawings. The distribution and integration of the apparatus are not limited to those illustrated in the figures. The device as a whole or in parts can be functionally or physically distributed or integrated in an arbitrary unit according to various attachments or how the device is to be used.

Using FIG. 25, the hardware configuration of the image processing apparatus 100 will be described. FIG. 25 is a diagram of an exemplary hardware configuration of the image processing apparatus 100. As shown in FIG. 25, the image processing apparatus 100 includes a central processing unit (CPU) 102, a random access memory (RAM) 103, and a read only memory (ROM) 104, they being connected to a bus 101. The CPU 102 generally controls the operations of the image processing apparatus 100. The CPU 102 uses the RAM 103 as a work area and executes a program stored in the ROM 104 to control whole operations of the image processing apparatus 100.

(3) Program

The image processing program that is executed by the image processing apparatus 100 is, in a mode, recorded as a file in an installable format or an executable form in a computer-readable recording medium, such as a CD-ROM, a flexible disk (FD), a CD-R, a digital versatile disk (DVD) and provided. The image processing program executed by the image processing apparatus 100 may be provided or distributed in a manner that the image processing program is stored in a computer that is connected to a network, such as the Internet, and downloaded via the network. The image processing program executed by the image processing apparatus 100 may be configured to be installed in, for example, a ROM and provided.

The image processing program executed by the image processing apparatus 100 is configured as a module including the above-descried units (the image input unit 110, the basis dictionary input unit 120, the pre-processing unit 130, the coding unit 140, the post-processing unit 150, and the image output unit 160). As practical hardware, the CPU (processor) reads the image processing program from the recording medium and executes the program and accordingly the units are loaded into the main storage device so that the image input unit 110, the basis dictionary input unit 120, the pre-processing unit 130, the coding unit 140, the post-processing unit 150, and the image output unit 160 are generated in the main storage device.

According to an aspect of the present invention, there is an advantage in that it is possible to maintain a preferable relation between the reproduction accuracy and processing time.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
circuitry configured to
acquire, from an image, a patch obtained by extracting a partial area of the image,
determine a value of a design parameter relating to processing of the patch according to an amount of information contained in the acquired patch and representing a state of distribution of pixel values,
generate a high-frequency patch from the patch by using the determined value of the design parameter,
determine the value of the design parameter that is at least any one of a sparse level representing a number of bases to be selected from a basis dictionary of the image, an extraction interval for extracting the partial area, and a patch size, based on the amount of information,
extract the partial area according to the extraction interval and the patch size,
determine the sparse level corresponding to the amount of information of the patch obtained by extracting the partial area according to a correspondence chart that stores a correspondence relation between the amount of information of the patch and the sparse level,
select combinations of medium-frequency bases and high-frequency bases corresponding in number to the determined sparse level, and
generate the high-frequency patch by taking linear sum of the high-frequency bases, where linear coefficients of each high-frequency bases are determined during the selection of corresponding medium-frequency bases.

2. The image processing apparatus according to claim 1, wherein the circuitry is further configured to measure the amount of information contained in the patch by using at least any one of arrangement of pixels and an amount of characteristics that quantifies an amount of change in pixel value.

3. The image processing apparatus according to claim 1, wherein the circuitry is further configured to determine the correspondence chart to be used from the relation between the amount of information of the patch obtained by extracting the partial area and frequency of the amount of information.

4. The image processing apparatus according to claim 1, wherein the circuitry is further configured to
set an extraction interval smaller than or equal to a predetermined value when the amount of information is equal to or larger than a predetermined threshold, and
set an extraction interval equal to or larger than the predetermined value when the amount of information is smaller than the predetermined threshold.

5. The image processing apparatus according to claim 1, wherein the circuitry is further configured to
acquire a surrounding patch obtained by extracting a surrounding area representing any one of an area that partially overlaps with the partial area, an area adjacent to the partial area, and an area distant from the partial area by a pixel or more and measures the amount of information of the acquired surrounding patch, and
set an extraction interval smaller than a predetermined value when the measured amount of information of the patch and the surrounding patch is equal to or larger than a predetermined threshold, and set an extraction interval equal to or larger than the predetermined value when the measured amount of information is smaller than the predetermined threshold.

6. The image processing apparatus according to claim 1, wherein the circuitry is further configured to
measure the amount of information of the patch obtained by extracting the partial area in a predetermined size,
extract the partial area in a size equal to or smaller than the predetermined size when the measured amount of information is equal to or larger than a predetermined threshold,
extract the partial area in a size equal to or larger than the predetermined size when the measured amount of information is smaller than the predetermined threshold, and
select a basis dictionary in which bases in the same size as that of the medium-frequency patch are accumulated.

7. The image processing apparatus according to claim 1, wherein the circuitry is further configured to
determine a plurality of design parameters according to at least any one of the measured amount of information and at least one type of amount of characteristics.

8. The image processing apparatus according to claim 1, wherein the circuitry is further configured to convert the image into a high-resolution image.

9. An image processing method comprising:
acquiring, with circuitry, from an image, a patch obtained by extracting a partial area of the image;
determining, with the circuitry, a value of a design parameter relating to processing of the patch according to an amount of information contained in the acquired patch and representing a state of distribution of pixel values,
generating, with the circuitry, a high-frequency patch from the patch by using the determined value of the design parameter,
determining, with the circuitry, the value of the design parameter that is at least any one of a sparse level representing a number of bases to be selected from a basis dictionary of the image, an extraction interval for extracting the partial area, and a patch size, based on the amount of information,
extracting, with the circuitry, the partial area according to the extraction interval and the patch size,
determining, with the circuitry, the sparse level corresponding to the amount of information of the patch obtained by extracting the partial area according to a correspondence chart that stores a correspondence relation between the amount of information of the patch and the sparse level,
selecting, with the circuitry, combinations of medium-frequency bases and high-frequency bases corresponding in number to the determined sparse level, and
generating, with the circuitry, the high-frequency patch by taking linear sum of the high-frequency bases, where linear coefficients of each high-frequency bases are determined during the selection of corresponding medium-frequency bases.

10. A non-transitory computer-readable recording medium that contains an image processing program that causes a computer to execute:
acquiring, from an image, a patch obtained by extracting a partial area of the image;
determining a value of a design parameter relating to processing of the patch according to an amount of information contained in the acquired patch and representing a state of distribution of pixel values;
generating a high-frequency patch from the patch by using the determined value of the design parameter;
determining the value of the design parameter that is at least any one of a sparse level representing a number of bases to be selected from a basis dictionary of the image, an extraction interval for extracting the partial area, and a patch size, based on the amount of information;
extracting the partial area according to the extraction interval and the patch size;
determining the sparse level corresponding to the amount of information of the patch obtained by extracting the partial area according to a correspondence chart that stores a correspondence relation between the amount of information of the patch and the sparse level;
selecting combinations of medium-frequency bases and high-frequency bases corresponding in number to the determined sparse level; and
generating the high-frequency patch by taking linear sum of the high-frequency bases, where linear coefficients of each high-frequency bases are determined during the selection of corresponding medium-frequency bases.

* * * * *